United States Patent
Joly et al.

(10) Patent No.: US 11,978,431 B1
(45) Date of Patent: May 7, 2024

(54) SYNTHETIC SPEECH PROCESSING BY REPRESENTING TEXT BY PHONEMES EXHIBITING PREDICTED VOLUME AND PITCH USING NEURAL NETWORKS

(71) Applicant: Amazon Technologies, Inc., Seattle, WA (US)

(72) Inventors: Arnaud Joly, Cambridge (GB); Simon Slangen, Edinburgh (GB); Alexis Pierre Moinet, Cambridge (GB); Thomas Renaud Drugman, Carnieres (BE); Panagiota Karanasou, Cambridge (GB); Syed Ammar Abbas, Cambridge (GB); Sri Vishnu Kumar Karlapati, Cambridge (GB)

(73) Assignee: Amazon Technologies, Inc., Seattle, WA (US)

( * ) Notice: Subject to any disclaimer, the term of this patent is extended or adjusted under 35 U.S.C. 154(b) by 111 days.

(21) Appl. No.: 17/326,886

(22) Filed: May 21, 2021

(51) Int. Cl.
| | | |
|---|---|---|
| *G10L 13/027* | (2013.01) | |
| *G10L 13/06* | (2013.01) | |
| *G10L 13/07* | (2013.01) | |
| *G10L 13/08* | (2013.01) | |
| *G10L 15/32* | (2013.01) | |

(52) U.S. Cl.
CPC .......... *G10L 13/027* (2013.01); *G10L 13/06* (2013.01); *G10L 13/07* (2013.01); *G10L 13/08* (2013.01); *G10L 15/32* (2013.01)

(58) Field of Classification Search
CPC ......... G10L 13/06; G10L 13/08; G10L 15/32; G10L 13/07; G10L 13/10; G10L 13/047
USPC .................................................. 704/267, 260
See application file for complete search history.

(56) References Cited

U.S. PATENT DOCUMENTS

| | | | | |
|---|---|---|---|---|
| 5,740,320 A | * | 4/1998 | Itoh ........................ | G10L 13/07 704/262 |
| 11,694,674 B1 | * | 7/2023 | Abbas ..................... | G10L 13/08 704/260 |
| 2006/0229877 A1 | * | 10/2006 | Tian ........................ | G10L 13/06 704/267 |
| 2012/0166198 A1 | * | 6/2012 | Lin .......................... | G10L 13/10 704/260 |
| 2018/0108351 A1 | * | 4/2018 | Beckhardt ............... | G10L 15/32 |
| 2021/0020161 A1 | * | 1/2021 | Gao ......................... | G10L 13/08 |
| 2022/0246132 A1 | * | 8/2022 | Zhang ..................... | G10L 13/047 |

FOREIGN PATENT DOCUMENTS

| | | | | |
|---|---|---|---|---|
| EP | 0689192 A1 | * | 12/1995 | ............... G10L 5/04 |
| GB | 2423903 | * | 9/2006 | ............. G10L 13/08 |

* cited by examiner

*Primary Examiner* — Farzad Kazeminezhad
(74) *Attorney, Agent, or Firm* — Pierce Atwood LLP

(57) ABSTRACT

A speech-processing system receives input data representing text. One or more encoders trained to predict audio properties corresponding to the text process the text to predict those properties. A speech decoder processes phoneme embeddings as well as the predicted properties to create data representing synthesized speech.

24 Claims, 17 Drawing Sheets

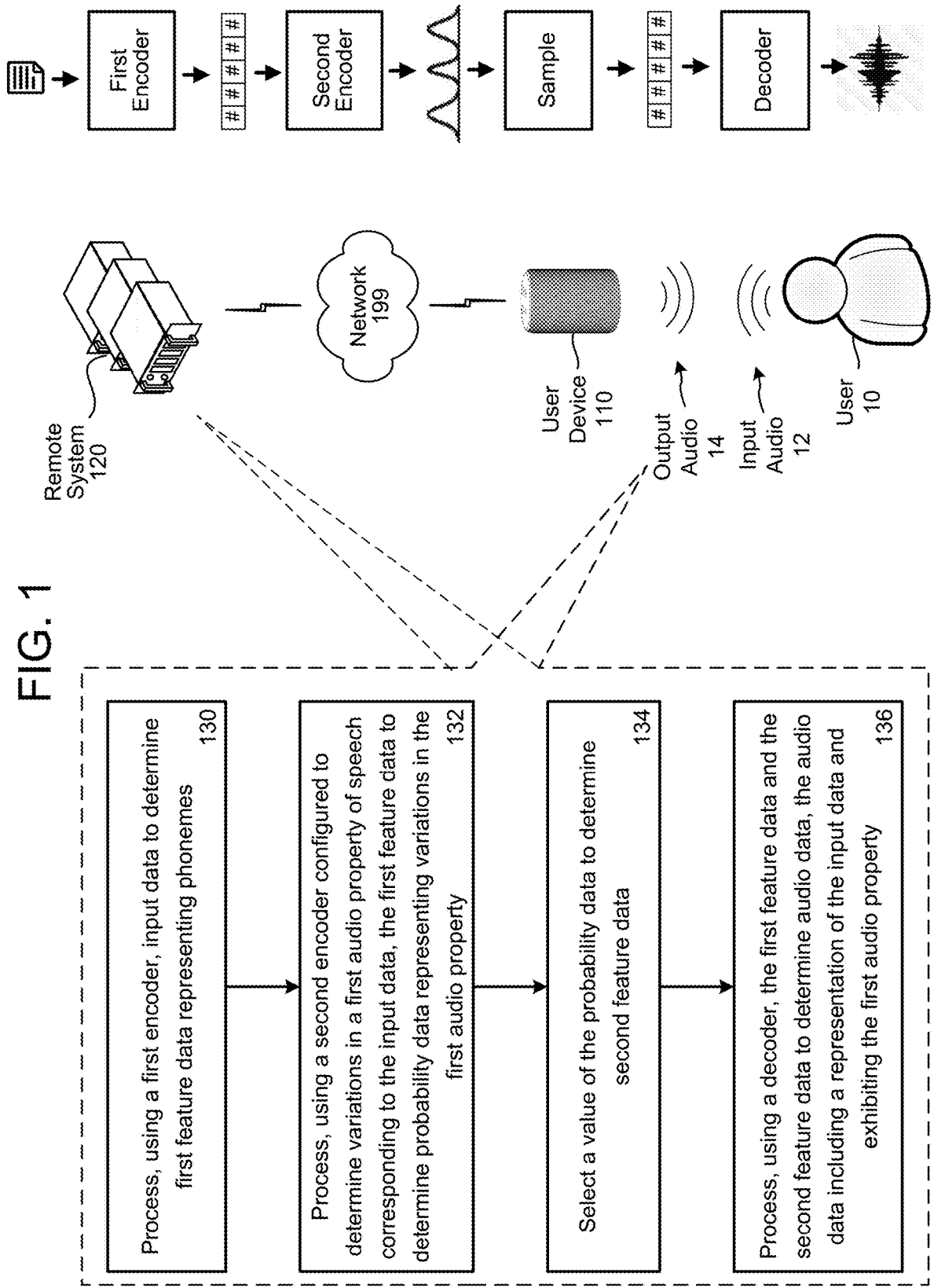

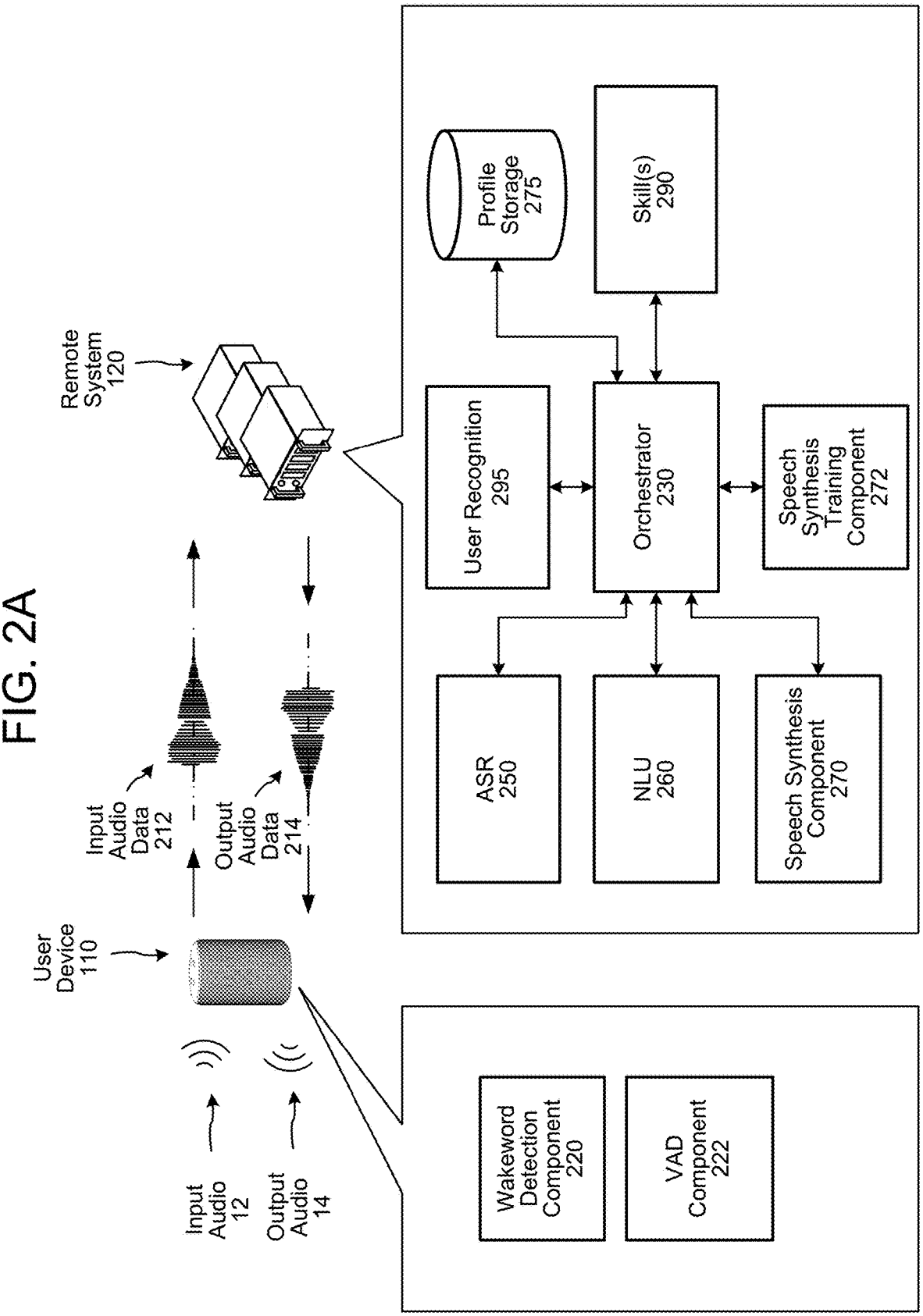

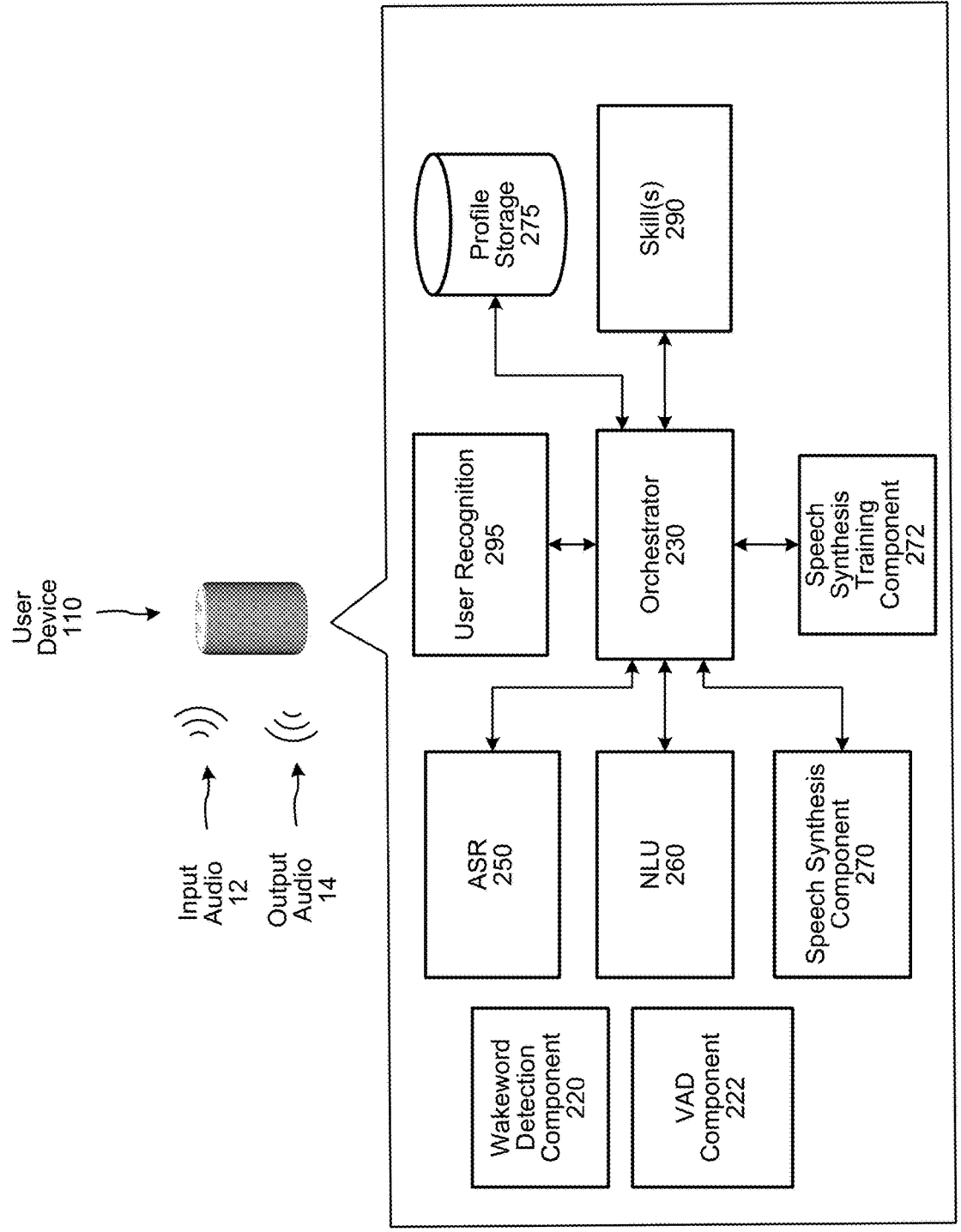

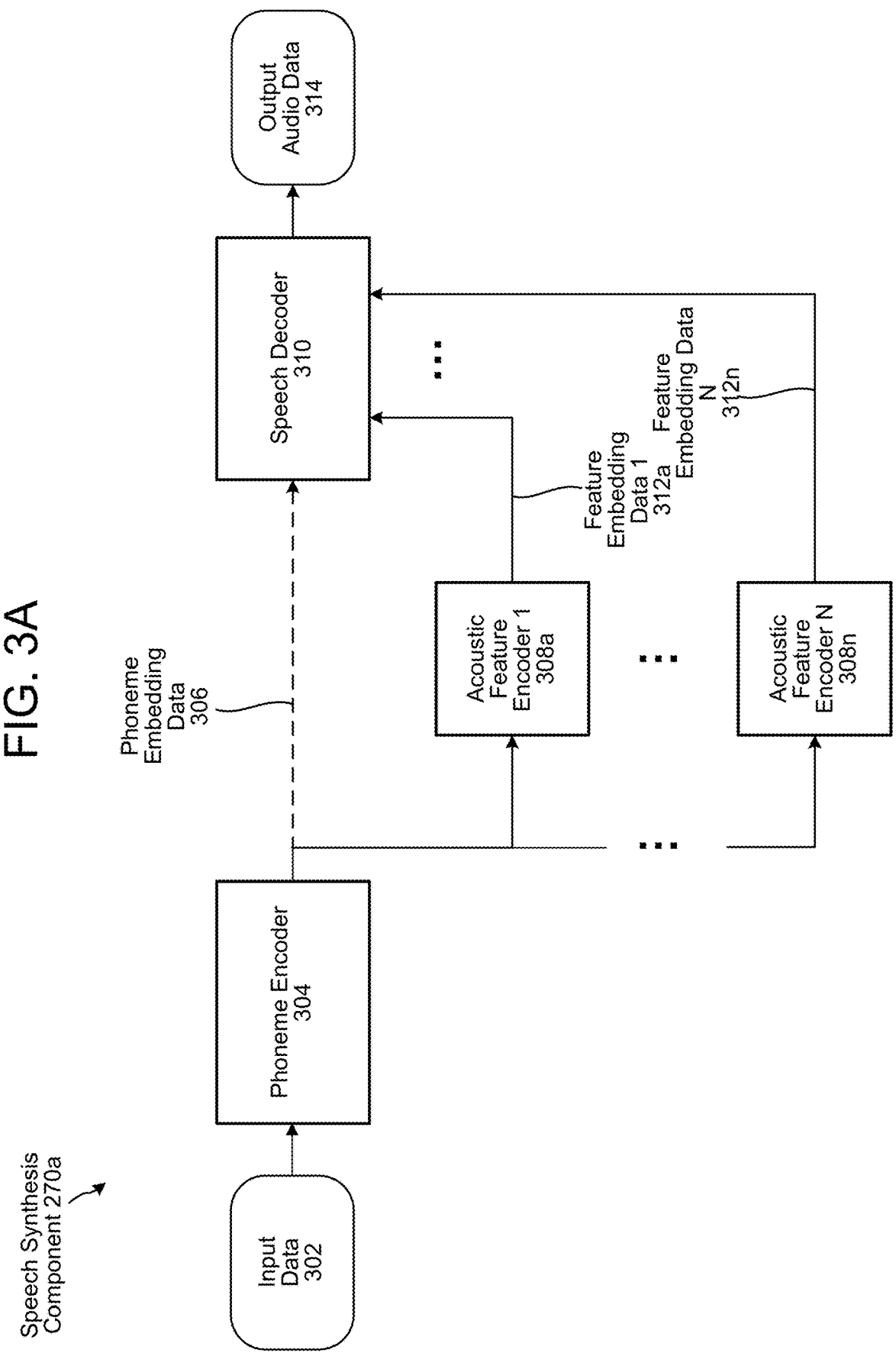

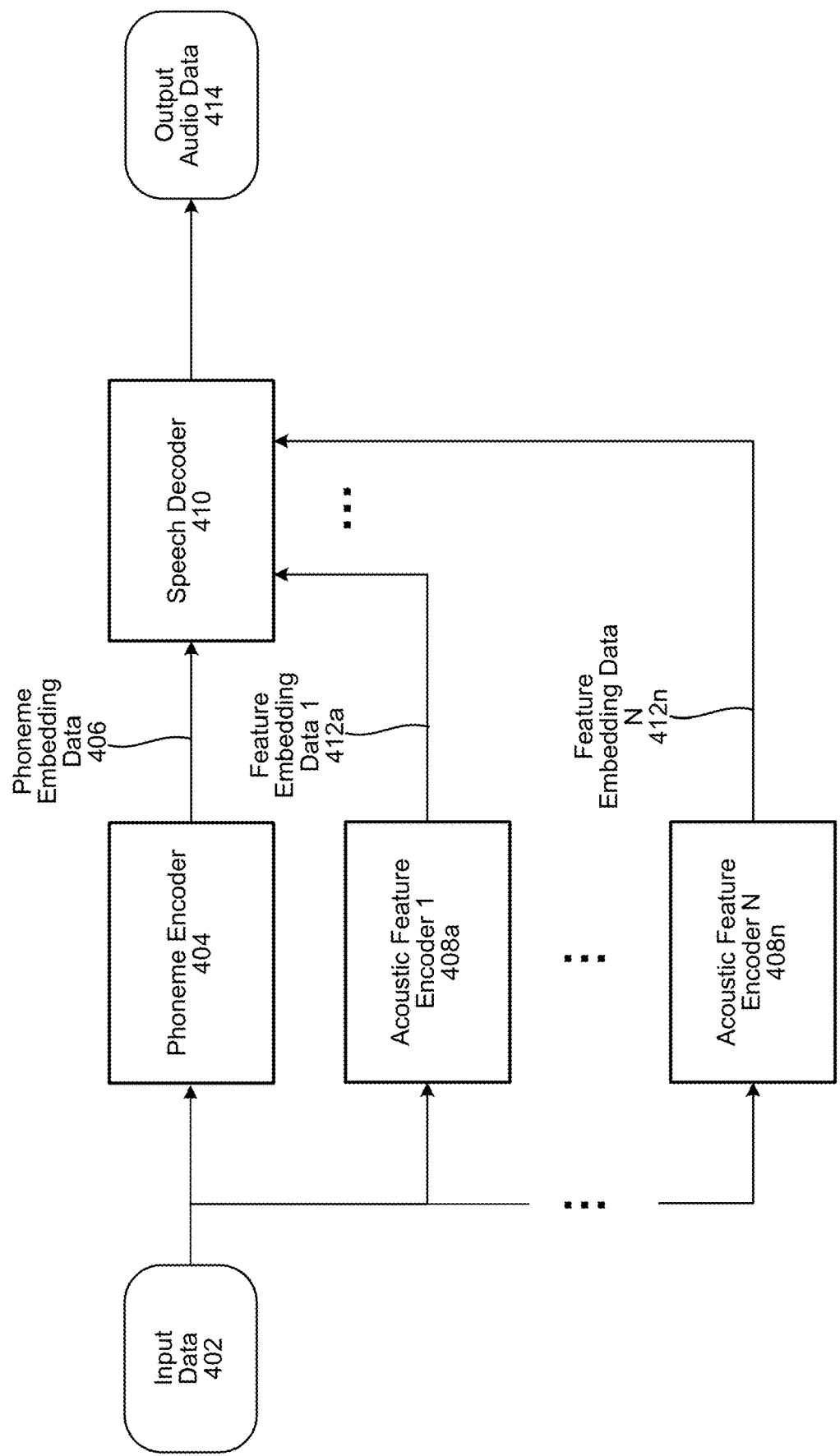

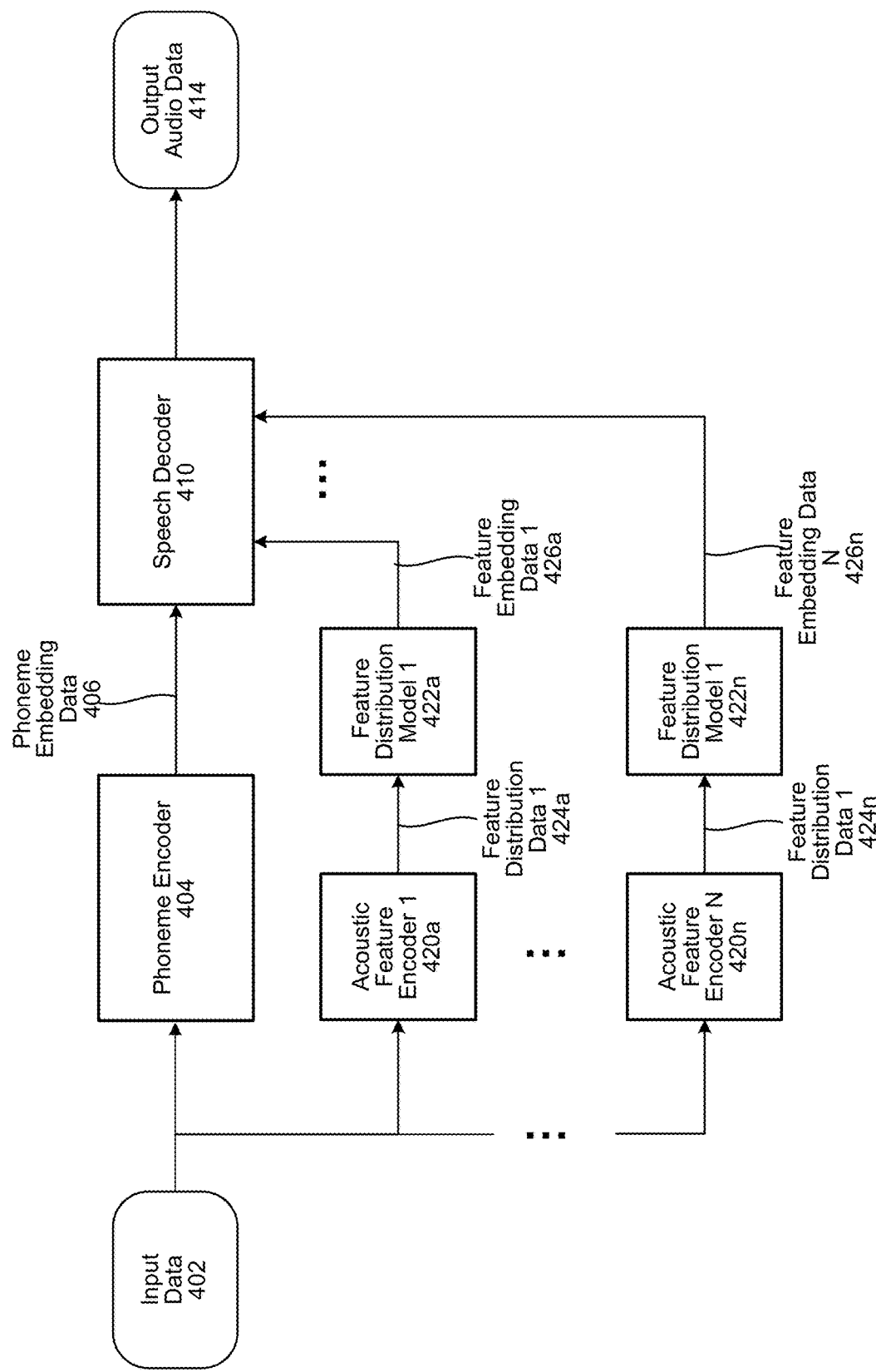

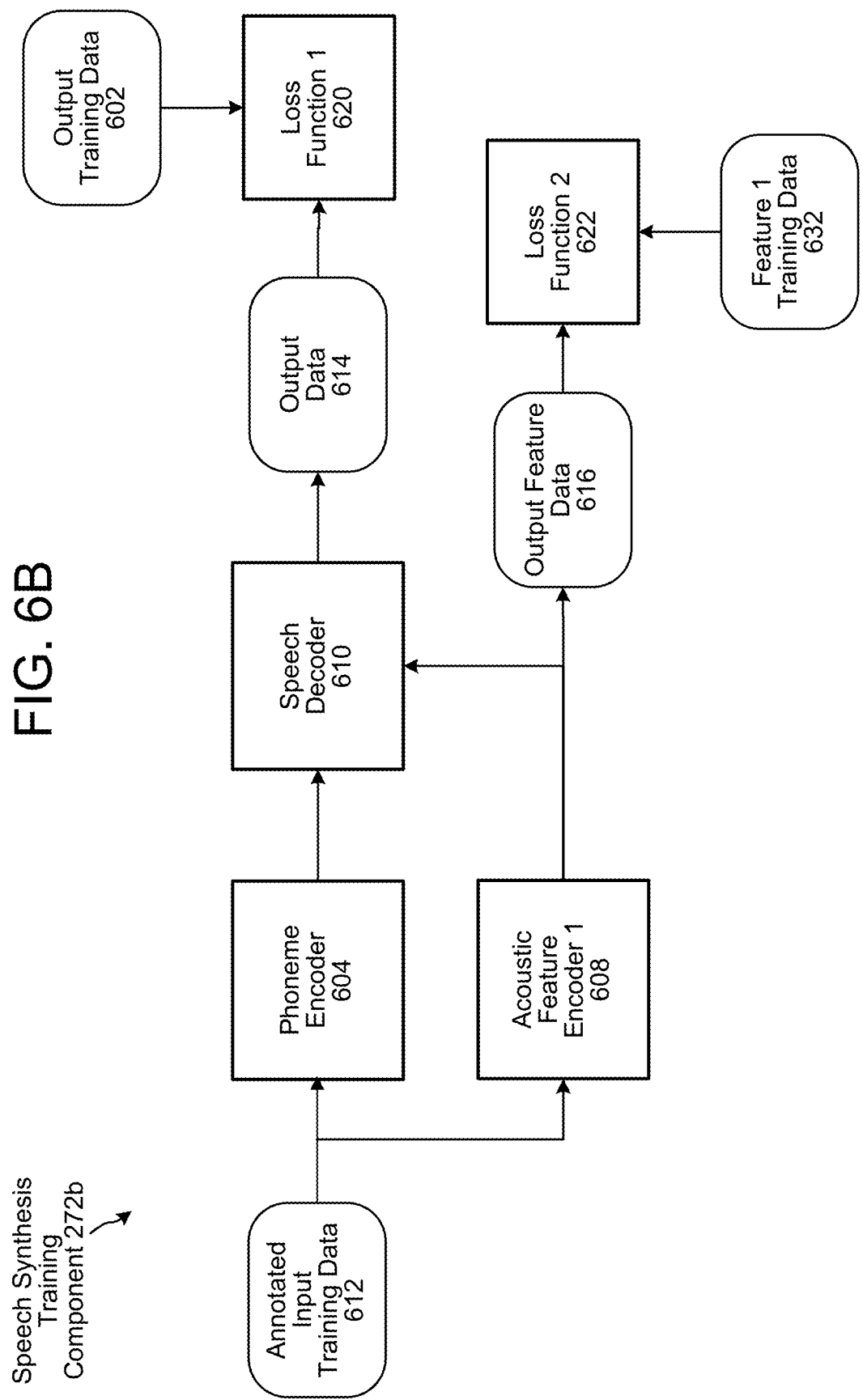

SYNTHETIC SPEECH PROCESSING BY REPRESENTING TEXT BY PHONEMES EXHIBITING PREDICTED VOLUME AND PITCH USING NEURAL NETWORKS

BACKGROUND

A speech-processing system includes a speech-synthesis component for processing input data, such as text data, to determine output data that includes a representation of synthetic speech corresponding to the text data. The synthetic speech includes variations in prosody, such as variations in speech rate, emphasis, timbre, or pitch. The prosody of the speech may be learned by processing training audio data and then determined by processing the text data.

BRIEF DESCRIPTION OF DRAWINGS

For a more complete understanding of the present disclosure, reference is now made to the following description taken in conjunction with the accompanying drawings.

FIG. 1 illustrates a method for speech processing according to embodiments of the present disclosure.

FIG. 2A illustrates components of a user device and of a remote system for speech processing according to embodiments of the present disclosure.

FIG. 2B illustrates components of a user device for speech processing according to embodiments of the present disclosure.

FIGS. 3A and 3B illustrate components for synthesizing audio data by processing input data according to embodiments of the present disclosure.

FIGS. 4A, 4B, 4C, and 4D illustrate additional components for synthesizing audio data by processing input data according to embodiments of the present disclosure.

FIGS. 6A and 6B illustrate components for training a model according to embodiments of the present disclosure.

DETAILED DESCRIPTION

Figure 3B:
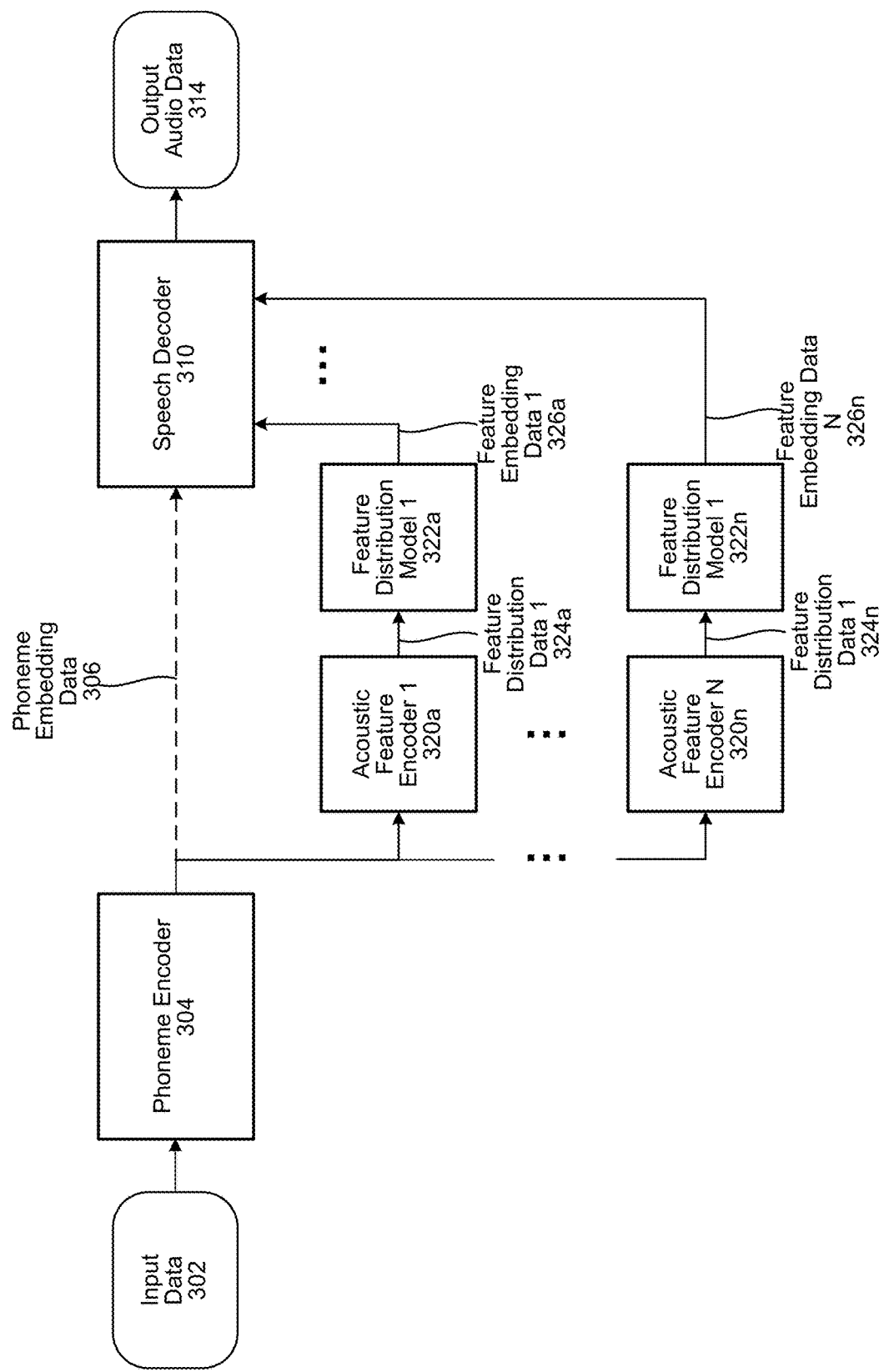

Speech-processing systems may include one or more speech-synthesis components that employ one or more of various techniques to generate synthesized speech from input data (such as text data or other data representing words such as word identifiers, indices or other indicators of words, word embedding data, etc.). The speech-synthesis component may include a phoneme encoder for processing the text data and determining phoneme embedding data representing a number of phonemes of the text data, one or more additional encoders for predicting one or more audio features of the synthetic speech, and a speech decoder for processing the phoneme encoded data and the predicted features to determine output data representing the speech.

As the term is used herein, "prosody" refers to the manner in which a given word, sentence, paragraph, or other unit of speech is spoken. Aspects of prosody may include the rate of the speech, the loudness of the speech, how syllables, words, or sentences in the speech are emphasized, when and where pauses in the speech may be inserted, or what emotion (e.g., happy, sad, or anxious) is expressed in the speech.

Aspects of the present disclosure thus relate to processing input data, such as text data, to determine output data that includes a representation of synthesized speech. In addition to processing the input data to determine the speech, the input data is processed to predict one or more audio properties corresponding to the input data, such as volume, pitch, and/or spectral tilt, and then using the predicted audio properties to generate audio data representing speech that reflects the predicted properties. Synthesized speech may appear to a human listener to be "flat" or "robotic"; by predicting the audio properties, and by then introducing appropriate variations in the audio properties, the synthesized speech may appear more natural to the human listener.

The speech-synthesis component may first be trained using training data that includes text data and corresponding speech data exhibiting corresponding prosody. The training data may be, for example, audio data representing a voice actor reading written content, such as a book, and corresponding text data representing the text of the book or metadata describing the text, such as locations of word boundaries, sentence boundaries, or chapter boundaries. The training data may be pre-processed to determine the one or more audio properties, and these determined properties may be used to train the model to predict them.

In various embodiments, the speech-processing system is disposed on a single device, such as a user device (e.g., Echo device, phone, tablet, Fire TV device, television, personal computer, etc.). In other embodiments, the speech-processing system is distributed across one or more user devices, such as a smartphone or other smart loudspeaker, and one or more remote systems, such as one or more server, storage, or computing machines. The user device may capture audio that includes human speech and then process the audio data itself or transmit the audio data representing the audio to the remote system for further processing. The user device may have, for example, a wakeword-determination component that detects presence of a wakeword in audio and transmits corresponding audio data to the remote system only when the wakeword is detected. As used herein, a "wakeword" is one or more particular words, such as "Alexa," "OK Google," and "Hey Siri," that a user of the user device may utter to cause the user device to begin processing subsequent audio data, which may further include a representation of a command, such as "tell me a funny story" or "read me the news."

The user device and/or remote system may include an automatic speech-recognition (ASR) component that processes the audio data to determine corresponding text data and a natural-language understanding (NLU) component that processes the text data to determine the intent of the user expressed in the text data and thereby determine an appropriate response to the intent. Determination of the response may include processing output of the NLU component using the speech-synthesis component, also referred to as a text-to-speech (TTS) processing component, to determine audio data representing the response. The user device may determine the response using a speech-synthesis component of the user device or the remote system may determine the response using a speech-synthesis component of the remote system and transmit data representing the response to the user device (or other device), which may then output the response. In other embodiments, a user of a user device may wish to transmit audio data for reasons other than ASR/NLU processing, such as one- or two-way audio communication with one or more other user devices or remote systems.

Referring to FIG. 1, a user 10 may provide input data, such as input audio 12, to a voice-controlled user device 110 or a display-enabled user device (e.g., a device featuring at least one display 916, such as a smartphone, tablet, or personal computer). The input data may include one or more user gestures directed to the user device, such as a touch-screen input, mouse click, or key press. The input data may further be or include input audio 12. The user device 110 may output audio 14 corresponding to the output data.

The user device 110 may, in some embodiments, receive input audio 12 and may transduce it (using, e.g., a microphone) into corresponding audio data. As explained in further detail herein, the user device 110 may perform additional speech processing or may send the audio data to a remote system 120 for further audio processing via a network 199. Regardless of whether it is performed by the user device 110 or the remote system 120, an ASR component may process the audio data to determine corresponding text data, and an NLU component may process the text data to determine NLU data such as a domain, intent, or entity associated with the text data.

In various embodiments, the user device 110 and/or remote system 120 receives text data representing words. The words may represent a response to a user command, a news story, a book, an article in a newspaper or a magazine, or any other such input data representing words. The input data may directly represent words of the text, such as ACSII data representing the words, or may be a representation of sub-word or sub-syllable sounds (herein referred to as "phonemes") representing the words. The input data may further include metadata corresponding to the text, such as locations of word boundaries, sentence boundaries, or paragraph boundaries. The user device 110 and/or the remote system 120 processes (130), using a first encoder, input data to determine first feature data representing to phonemes. As explained in greater detail below, the first encoder may output an embedding that uniquely identifies the input data.

The user device 110 and/or the remote system 120 processes (132), using a second encoder trained to output a first audio property of speech corresponding to the input data, the first feature data to determine probability data representing variations in the first audio property, such as a probability distribution corresponding to the prediction of the first audio property. For example, a pitch of speech may be represented on a scale of 1 to 10. Rather than determining that the pitch equals a certain number (e.g., 5), the probability distribution may specify that the pitch is likely to be 5, but might also be 4 or 6, or may less likely be 3 or 7.

The user device 110 and/or the remote system 120 may similarly process, using a third encoder trained to predict a second audio property of speech corresponding to the text data, the first feature data to determine third feature data, the third feature data representing a prediction of the second audio property. As explained in greater detail herein, the speech-synthesis component may be trained to predict one or more audio properties, such as pitch, volume, and/or spectral tilt, which may then be used to produce synthesized speech in accordance with those properties. In some embodiments, as explained in greater detail below, one or more of the encoders are variational autoencoders (VAEs) capable of producing variations in their output even when processing identical inputs. The VAE(s) may determine the probability distribution data, which may be one or more standard distributions defined by mu and sigma values.

The user device 110 and/or the remote system 120 may sample (134) the probability distribution to determine the second feature data. As the term is used herein, "sampling" refers to selecting a value on the probability distribution in accordance with the probably. Continuing the example from above, if probability distribution specifies that 5 is a likely value, 4 and 6 are less likely values, and 3 and 7 are less likely still, sampling the distribution would most often yield the value 5, would sometimes yield the values 4 or 6, and would rarely (but sometimes) yield the values 3 or 7.

The user device 110 and/or the remote system 120 processes (136), using a decoder, the first feature data and the second feature data (and, in some embodiments, the third and/or additional feature data) to determine audio data, the audio data including a representation of the input data and exhibiting the first audio property (and, in some embodiments, the second and/or additional audio property. The decoder may be a speech decoder, as shown in FIG. 7B, and may be autoregressive (that is, a portion of its output may depend at least in part on a previous output). The various inputs to the decoder may be concatenated together before the decoder begins processing the inputs. The output of the decoder may be a mel-spectrogram; a vocoder may process the mel-spectrogram to determine time-domain audio data representing the speech.

Referring to FIGS. 2A and 2B, a speech synthesis component 270 may process input data (e.g., text data) to determine audio output data representing synthesized speech corresponding to the text data. A speech synthesis training component 272 may process training data (e.g., audio data representing speech and text data corresponding to the speech) to train the speech-synthesis component 270 or speech-synthesis training component 272 to determine synthesized speech in accordance with predicted prosody. Each of the speech synthesis component 270 and the speech synthesis training component 272 are described in greater detail herein and with reference to FIGS. 3A, 3B, 4A, 4B, 5, 6A, and 6B.

Referring to FIG. 2A, the user device 110 may capture audio that includes speech and then either process the audio itself or transmit audio data representing the audio to the remote system 120 for further processing. The remote system 120 may have access to greater computing resources, such as more or faster computer processors, than does the user device, and may thus be able to process the audio data and determine corresponding output data faster than the user device. The user device 110 may have, a wakeword-determination component 220 that detects presence of a wakeword in audio and transmits corresponding audio data to the remote system only when (or after) the wakeword is detected. As used herein, a "wakeword" is one or more particular words, such as "Alexa," that a user of the user device may utter to cause the user device to begin processing the audio data, which may further include a representation of a command, such as "turn on the lights."

Referring also to FIG. 2B, the speech-processing system, including the speech synthesis component 270 and the speech synthesis training component 272 may disposed wholly on the user device 110. In other embodiments, some additional components, such as an ASR component, are disposed on the user device 110, while other components are disposed on the remote system 120. Any distribution of the components of the speech-processing system of the present disclosure is, thus, within the scope of the present disclosure. The discussion herein thus pertains to both the distribution of components of FIGS. 2A and 2B and also to similar distributions.

The user device 110 or remote system 120 may further include an automatic speech-recognition (ASR) component that processes the audio data to determine corresponding text data and a natural-language understanding (NLU) component that processes the text data to determine the intent of the user expressed in the text data and thereby determine an appropriate response to the intent. The remote system 120 may determine and transmit data representing the response to the user device 110 (or other device), which may then output the response.

Before processing the audio data, the device 110 may use various techniques to first determine whether the audio data includes a representation of an utterance of the user 10. For example, the user device 110 may use a voice-activity detection (VAD) component 222 to determine whether speech is represented in the audio data based on various quantitative aspects of the audio data, such as the spectral slope between one or more frames of the audio data, the energy levels of the audio data in one or more spectral bands the signal-to-noise ratios of the audio data in one or more spectral bands or other quantitative aspects. In other examples, the VAD component 222 may be a trained classifier configured to distinguish speech from background noise. The classifier may be a linear classifier, support vector machine, or decision tree. In still other examples, hidden Markov model (HMM) or Gaussian mixture model (GMM) techniques may be applied to compare the audio data to one or more acoustic models in speech storage; the acoustic models may include models corresponding to speech, noise (e.g., environmental noise or background noise), or silence.

If the VAD component 222 is being used and it determines the audio data includes speech, the wakeword-detection component 220 may only then activate to process the audio data to determine if a wakeword is likely represented therein. In other embodiments, the wakeword-detection component 220 may continually process the audio data (in, e.g., a system that does not include a VAD component.) The user device 110 may further include an ASR component for determining text data corresponding to speech represented in the input audio 12 and may send this text data to the remote system 120.

The trained model(s) of the VAD component 222 or wakeword-detection component 220 may be CNNs, RNNs, acoustic models, hidden Markov models (HMMs), or classifiers. These trained models may apply general large-vocabulary continuous speech recognition (LVCSR) systems to decode the audio signals, with wakeword searching conducted in the resulting lattices or confusion networks. Another approach for wakeword detection builds HMMs for each key wakeword word and non-wakeword speech signals respectively. The non-wakeword speech includes other spoken words, background noise, etc. There may be one or more HMMs built to model the non-wakeword speech characteristics, which may be referred to as filler models. Viterbi decoding may be used to search the best path in the decoding graph, and the decoding output is further processed to make the decision on wakeword presence. This approach can be extended to include discriminative information by incorporating a hybrid DNN-HMM decoding framework. In another example, the wakeword-detection component may use convolutional neural network (CNN)/recursive neural network (RNN) structures directly, without using a HMM. The wakeword-detection component may estimate the posteriors of wakewords with context information, either by stacking frames within a context window for a DNN, or using a RNN. Follow-on posterior threshold tuning or smoothing may be applied for decision making.

The remote system 120 may be used for additional audio processing after the user device 110 detects the wakeword or speech, potentially begins processing the audio data with ASR or NLU, or sends corresponding audio data 212. The remote system 120 may, in some circumstances, receive the audio data 212 from the user device 110 (or other devices or systems) and perform speech processing thereon. Each of the components illustrated in FIGS. 2A and 2B may thus be disposed on either the user device 110 or the remote system 120. The remote system 120 may be disposed in a location different from that of the user device 110 (e.g., a cloud server) or may be disposed in the same location as the user device 110 (e.g., a local hub server).

The audio data 212 may be sent to, for example, an orchestrator component 230 of the remote system 120. The orchestrator component 230 may include memory and logic that enables the orchestrator component 230 to transmit various pieces and forms of data to various components of the system 120. An ASR component 250, for example, may first transcribe the audio data into text data representing one or more hypotheses corresponding to speech represented in the audio data 212. The ASR component 250 may transcribe the utterance in the audio data based on a similarity between the utterance and pre-established language models. For example, the ASR component 250 may compare the audio data with models for sounds (which may include, e.g., subword units, such as phonemes) and sequences of sounds represented in the audio data to identify words that match the sequence of sounds spoken in the utterance. These models may include, for example, one or more finite state transducers (FSTs). An FST may include a number of nodes connected by paths. The ASR component 250 may select a first node of the FST based on a similarity between it and a first subword unit of the audio data. The ASR component 250 may thereafter transition to second and subsequent nodes of the FST based on a similarity between subsequent subword units and based on a likelihood that a second subword unit follows a first.

After determining the text data, the ASR component 250 may send (either directly or via the orchestrator component 230) the text data to a corresponding NLU component 260. The text data output by the ASR component 250 may include a top-scoring hypothesis or may include an N-best list including multiple hypotheses (e.g., a list of ranked possible interpretations of text data that represents the audio data). The N-best list may additionally include a score associated with each hypothesis represented therein. Each score may indicate a confidence of ASR processing performed to generate the hypothesis with which it is associated.

The NLU component 260 may process the text data to determine a semantic interpretation of the words represented in the text data. That is, the NLU component 260 determines one or more meanings associated with the words represented in the text data based on individual words represented in the text data. The meanings may include a domain, an intent, and one or more entities. As those terms are used herein, a domain represents a general category associated with the command, such as "music" or "weather." An intent represents a type of the command, such as "play a song" or "tell me the forecast for tomorrow." An entity represents a specific person, place, or thing associated with the command, such as "Toto" or "Boston." The present disclosure is not, however, limited to only these categories associated with the meanings (referred to generally herein as "natural-understanding data," which may include data determined by the NLU component 260 or the dialog manager component.)

The NLU component 260 may determine an intent (e.g., an action that the user desires the user device 110 or remote system 120 to perform) represented by the text data or pertinent pieces of information in the text data that allow a device (e.g., the device 110, the system 120, etc.) to execute the intent. For example, if the text data corresponds to "play Africa by Toto," the NLU component 260 may determine that a user intended the system to output the song Africa performed by the band Toto, which the NLU component 260 determines is represented by a "play music" intent. The NLU component 260 may further process the speaker identifier to determine the intent or output. For example, if the text data corresponds to "play my favorite Toto song," and if the identifier corresponds to "Speaker A," the NLU component may determine that the favorite Toto song of Speaker A is "Africa."

The user device 110 or remote system 120 may include one or more skills 290. A skill 290 may be software such as an application. That is, the skill 290 may enable the user device 110 or remote system 120 to execute specific functionality in order to provide data or produce some other output requested by the user 10. The user device 110 or remote system 120 may be configured with more than one skill 290. For example, a speech-configuration skill may enable use of the speech-parameter determination component 202, encoded data determination component 204, speech synthesis component 270, and the speech parameter visualization component 206 described herein.

In some instances, a skill 290 may provide output text data responsive to received NLU results data. The device 110 or system 120 may include a speech synthesis component 270 that generates output audio data from input data or input audio data and the encoded data. The speech synthesis component 270 may use one of a variety of speech-synthesis techniques. In one method of synthesis called unit selection, the speech synthesis component 270 analyzes text data against a database of recorded speech. The speech synthesis component 270 selects units of recorded speech matching the text data and concatenates the units together to form output audio data. In another method of synthesis called parametric synthesis, the speech synthesis component 270 varies parameters such as frequency, volume, and noise to create output audio data including an artificial speech waveform. Parametric synthesis uses a computerized voice generator, sometimes called a vocoder. In another method of speech synthesis, a trained model, which may be a sequence-to-sequence model, directly generates output audio data based on the input data, as shown in FIGS. 3A, 3B, 4A, 4B, and 5.

The user device 110 and/or remote system 120 may include a speaker-recognition component 295. The speaker-recognition component 295 may determine scores indicating whether the audio data 212 originated from a particular user or speaker. For example, a first score may indicate a likelihood that the audio data 212 is associated with a first synthesized voice and a second score may indicate a likelihood that the speech is associated with a second synthesized voice. The speaker recognition component 295 may also determine an overall confidence regarding the accuracy of speaker recognition operations. The speaker recognition component 295 may perform speaker recognition by comparing the audio data 212 to stored audio characteristics of other synthesized speech. Output of the speaker-recognition component 295 may be used to inform NLU processing as well as processing performed by the skill 290.

The user device 110 or remote system 120 may include a profile storage 275. The profile storage 275 may include a variety of information related to individual users or groups of users who interact with the device 110. The profile storage 275 may similarly include information related to individual speakers or groups of speakers that are not necessarily associated with a user account.

Each profile may be associated with a different user or speaker. A profile may be specific to one user or speaker or a group of users or speakers. For example, a profile may be a "household" profile that encompasses profiles associated with multiple users or speakers of a single household. A profile may include preferences shared by all the profiles encompassed thereby. Each profile encompassed under a single profile may include preferences specific to the user or speaker associated therewith. That is, each profile may include preferences unique from one or more user profiles encompassed by the same user profile. A profile may be a stand-alone profile or may be encompassed under another user profile. As illustrated, the profile storage 275 is implemented as part of the remote system 120. The profile storage 275 may, however, may be disposed on the user device 110 or in a different system in communication with the user device 110 or system 120, for example over the network 199. The profile data may be used to inform speech processing.

Each profile may include information indicating various devices, output capabilities of each of the various devices, or a location of each of the various devices 110. This device-profile data represents a profile specific to a device. For example, device-profile data may represent various profiles that are associated with the device 110, speech processing that was performed with respect to audio data received from the device 110, instances when the device 110 detected a wakeword, etc. In contrast, user- or speaker-profile data represents a profile specific to a user or speaker.

FIGS. 3A and 3B illustrate components for synthesizing audio data representing speech according to embodiments of the present disclosure. Referring first to FIG. 3A, a speech-synthesis component 270a may include a phoneme encoder 304 that processes input data 302 to determine phoneme embedding data 306. The phoneme encoder 304 may be a neural network and may process the text input data 302, which may be a sequence of phonemes representing text, to determine the phoneme embedding data 306, which may be a vector of N values that represents the sequence. If the text input data 302 is a sequence of phonemes representing a word, for example, the phoneme embedding data 306 may be a vector of values that uniquely represents the word. Similarly, if the text input data 302 is a sequence of phonemes representing a sentence, paragraph, chapter, or book, the phoneme embedding data 306 may be a vector of values that uniquely represents the sentence, paragraph, chapter, or book. The phoneme embedding data 306 may thus correspond to a point in an embedding space corresponding to the text input data 302, wherein the embedding space is an N-dimensional space representing all possible words, sentences, paragraphs, chapters, or books. Points near each other in the embedding space may represent similar items of text input data 302, while points far from each other in the embedding space may represent dissimilar items of text input data 302.

One or more acoustic feature encoder(s) 308a . . . 308n may also process the phoneme embedding data 306 to determine feature embedding data 312a . . . 312n. The feature embedding data 312a . . . 312n may represent a prediction of one or more audio property corresponding to the output audio data 314, such as volume, speed, and/or spectral tilt. The phoneme encoder 304 and the acoustic feature encoder(s) 308a . . . 308n are described in greater detail below with respect to FIG. 7A.

A speech decoder 310 may process both the phoneme embedding data 306 and the feature embedding data 312a . . . 312n to determine audio output data 314. The audio output data 314 may include a representation of synthesized speech that corresponds to words in the text input data 302 as well as prosody represented in the feature embedding data 312a . . . 312n. In some embodiments, the audio output data 314 includes representations of spectrogram data, such as Mel-spectrogram data, that represents speech. In some embodiments, the decoder 310 does not process the phoneme embedding data 306. The speech decoder 310 is described in greater detail below with reference to FIG. 7B.

Referring to FIG. 3B, the speech-synthesis component 270b may similarly include a phoneme encoder 304 and a speech decoder 310. In some embodiments, however, the acoustic feature encoder(s) 320a . . . 320n are variational autoencoders (VAE). The output feature distribution data 324a . . . 324n of each acoustic feature encoder(s) 320a . . . 320n may therefore be a probability distribution corresponding to the likelihood that each dimension of the probability represents the audio property of the audio output data 314. The output feature distribution data 324a . . . 324n may be a set of parameters, such as mu and sigma parameters, that describe a distribution in each of N dimensions.

One or more feature distribution models 322a . . . 322n may sample the distributions represented by the feature distribution data 324a . . . 324n to determine the feature embedding data 326a . . . 326n. In some embodiments, the feature distribution models 322a . . . 322n randomly samples the feature distribution data 324a . . . 324n to determine the feature embedding data 326a . . . 326n.

Referring to FIG. 4A, the speech-synthesis component 270c may similarly include a phoneme encoder 404, a speech decoder 410, and one or more acoustic feature encoders 408a . . . 408n. In some embodiments, however, the acoustic feature encoders 408a . . . 408n process the input data 402 instead of processing the phoneme embedding data 406, as described above with reference to FIG. 3A. Similarly, referring to FIG. 4B, a speech-synthesis component 270d may include acoustic feature encoders 420a . . . 420n configured as variational autoencoders that similarly process the input data 402 in lieu of processing the phoneme embedding data 406.

Figure 4C:
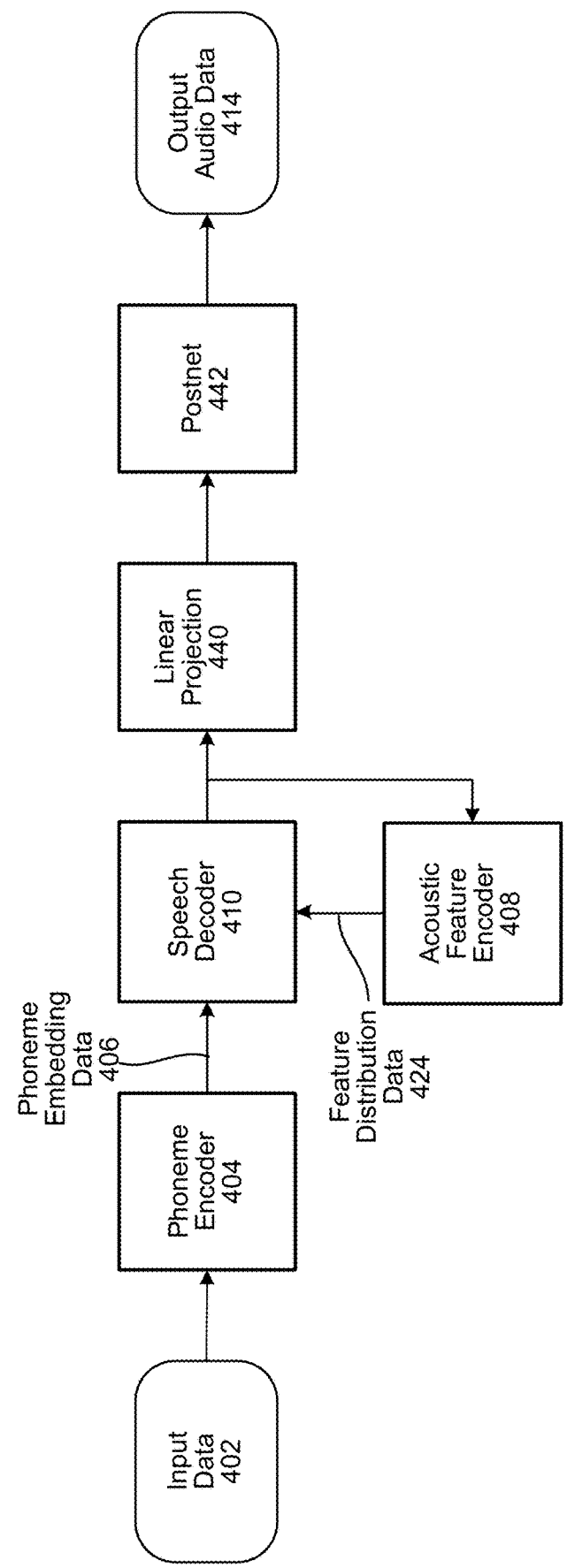
Figure 4D:
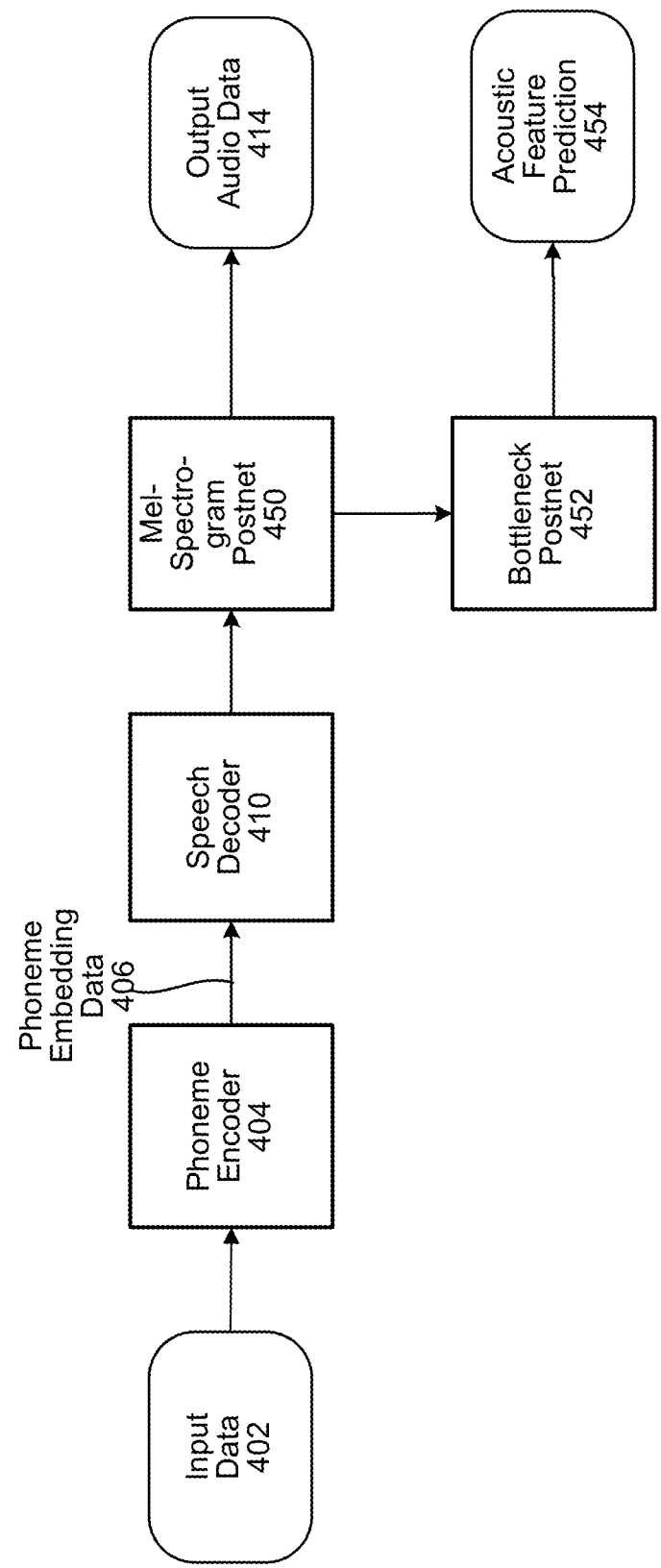

Referring to FIG. 4C, the speech-synthesis component 270e may similarly include a phoneme encoder 404, a speech decoder 410, and an acoustic feature encoder 408. The acoustic feature encoder 408 may, however, process the output of the speech decoder 410 to determine feature distribution data 424, which may be in turn processed by the speech decoder 410. A linear projection component 440 and a postnet layer 442 may process the output of the speech decoder to determine the output audio data 414. Referring to FIG. 4D, the speech-synthesis component 270e may similarly include a phoneme encoder 404 and a speech decoder 410. A first postnet layer 450, which may be a mel-spectrogram postnet layer 450, may determine the output audio data 414. A bottleneck postnet layer 452 may process the output of the postnet layer 450 to determine acoustic feature prediction data 454, which may be compared with training data using a loss function (such as the loss function 2 622 of FIG. 6B).

Figure 5:
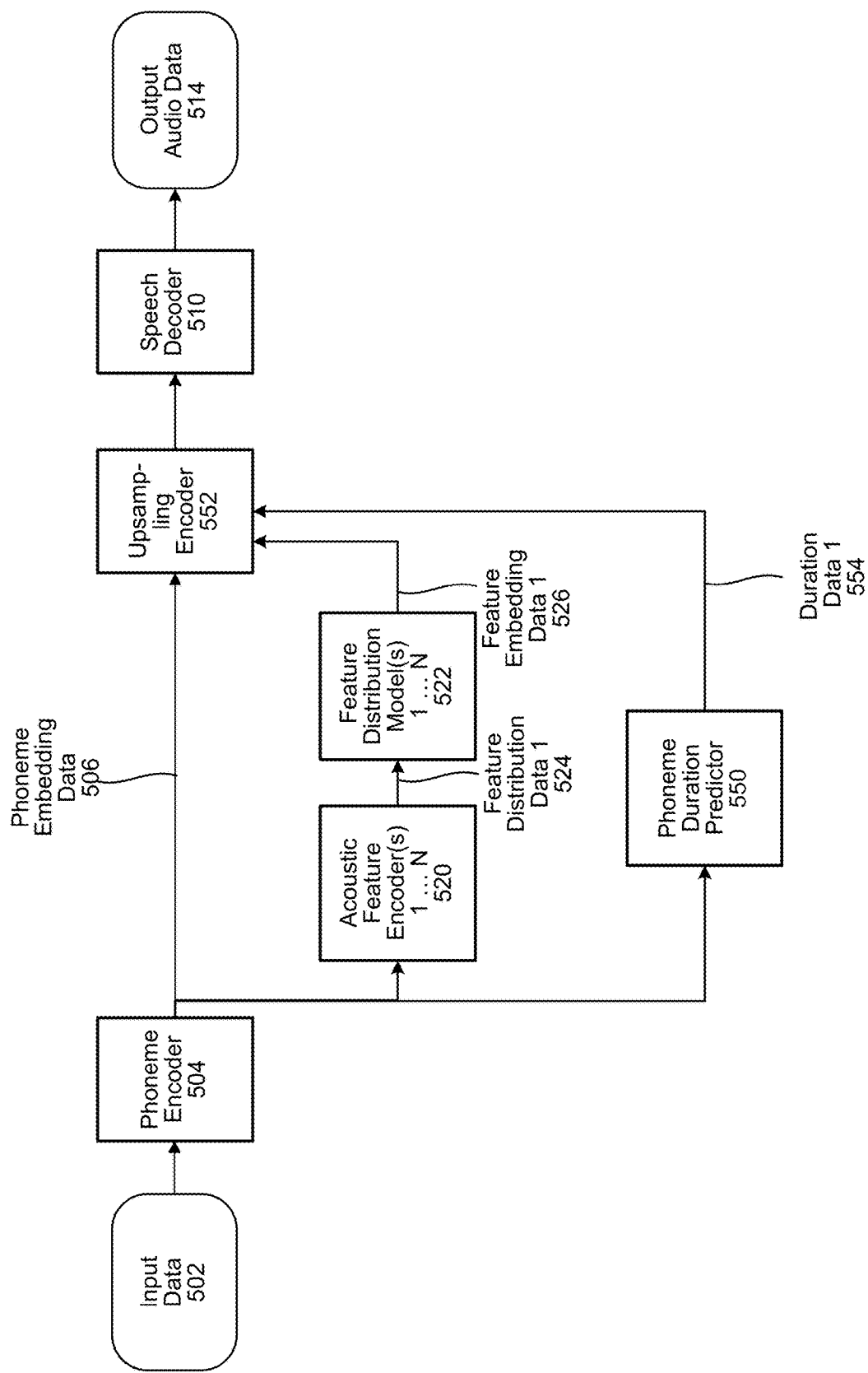
FIG. 5 illustrates additional components for synthesizing audio data by processing input data according to embodiments of the present disclosure.

Referring to FIG. 5, a speech-synthesis component 270g may include an upsampling encoder 552 that upsamples the feature embedding data 526 for application to the phoneme embedding data 506 in accordance with duration data 554 determined by a phoneme duration predictor 550. The phoneme duration predictor 550 may thus determine, for a given item of feature embedding data 526, how many items of phoneme data (and/or parts of phonemes) should be modified using the item of feature embedding data 526. For example, if a given item of duration data corresponds to duration of "5," the upsampling encoder 552 may upsample (e.g., duplicate) a corresponding item of feature embedding data 526 by a factor of 5 and apply the feature embedding data to five phonemes in the phoneme embedding data 506.

The phoneme duration predictor 550 may include one or more BiLSTM layer(s) that may process the phoneme embedding data 506, and one or more CNN layer(s) that may process the output of the BiLSTM layer(s). One or more LSTM layer(s) may process the output(s) of the CNN layer(s) to determine the duration data 554. In some embodiments, the phoneme duration predictor 550 includes one BiLSTM layer, three CNN layers, and one LSTM layer.

Figure 6A:
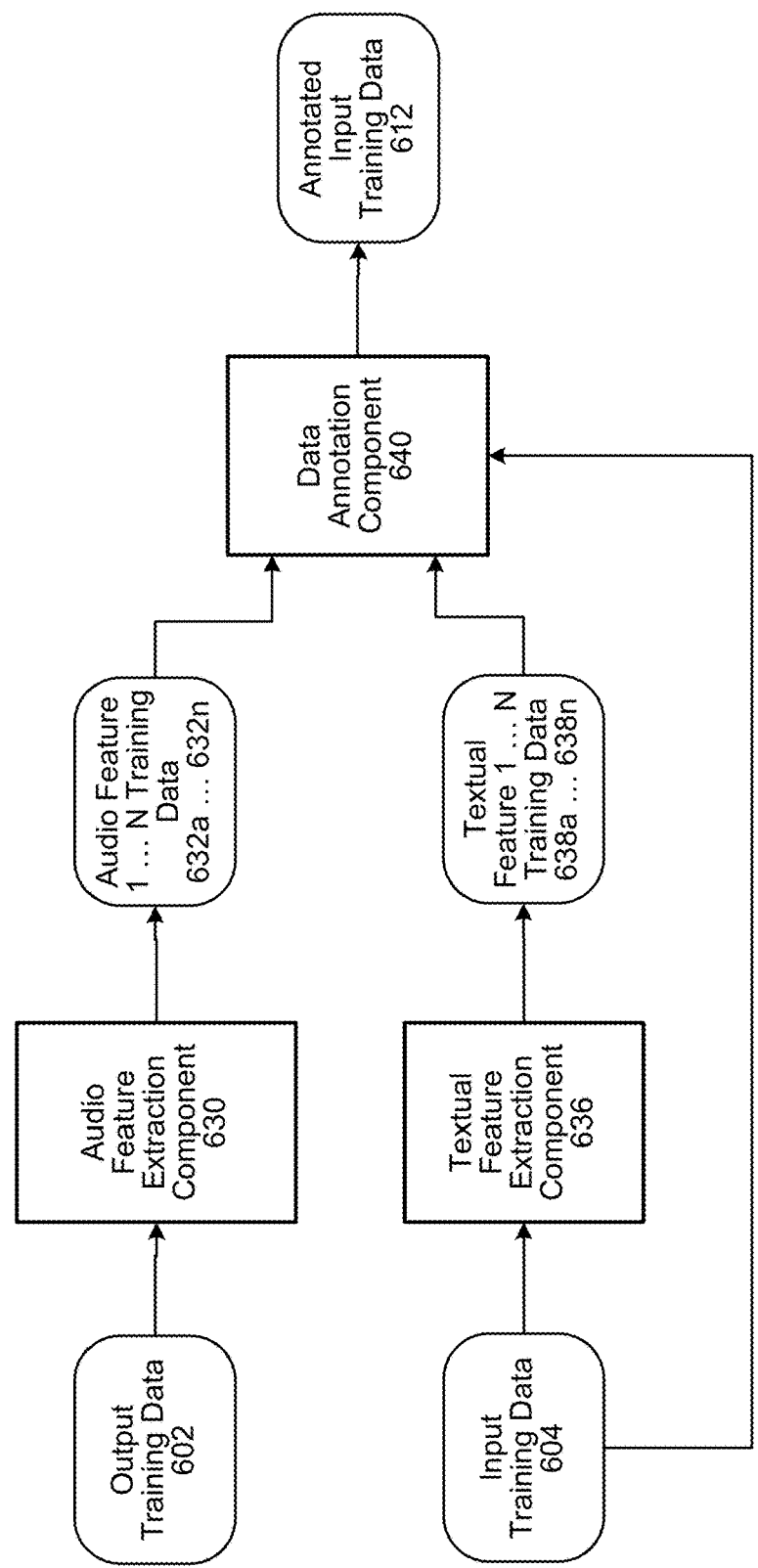

FIGS. 6A and 6B illustrate components for training a model according to embodiments of the present disclosure. Referring first to FIG. 6A, an audio feature-extraction component 630 may process output training data 602 (e.g., audio data that includes a representation of speech) to determine one or more items of feature training data 632a . . . 632n, such as volume, pitch, and/or spectral tilt. The audio feature training data 632a . . . 632n is not limited, however, to only these audio properties, and other audio properties, such as speed and/or emphasis, are within the scope of the present invention. The audio feature-extraction component 630 may include, for example, a component that determines pitch by extracting frequencies from a Mel-spectrogram of the output training data.

The speech-synthesis training component 272a may further include a textual feature extraction component 636 that processes the input training data 604 (e.g., text data) to determine one or more items of textual feature training data 638a . . . 638n. The textual feature extraction component 636 may include a trained model that processes the input training data 604 using one or more feed-forward and/or recurrent layers to determine the textual feature training data 638a . . . 638n. The textual feature training data 638a . . . 638n may include an emotion associated with the input training data 604, a voice type (e.g., newscaster) associated with the textual feature training data 638a . . . 638n, or other such textual features.

A data annotation component 640 may annotate the input training data 602 using the audio feature training data 632 and/or the textual feature training data 638. That is, the data annotation component 640 may associate a first item of audio feature training data 632 and/or textual feature training data 638 with a first phoneme of the input training data 602, a second item of audio feature training data 632 and/or textual feature training data 638 with a second phoneme of the input training data 602, and so on. In some embodiments, the data annotation component 640 associates items of audio feature training data 632 and/or textual feature training data 638 with sub-phoneme units. The data annotation component 640 may, for example, break a phoneme down into three segments—a beginning, middle, and end—and associated items of audio feature training data 632 and/or textual feature training data 638 with each subunit. The data annotation component 640 may then output annotated input training data 612 which may be processed according to FIG. 6B.

Referring to FIG. 6B, the phoneme encoder 604, speech decoder 610, and one or more acoustic feature encoders 608 may be trained in accordance with two or more "tasks" (e.g., multi-task training). A first loss function 620 may compare the output data 614 determined by the speech decoder 610 with the output training data 602a (e.g., the target data). To minimize the result of the loss function, new values of nodes (e.g., offsets and/or weights) may be determined for the decoder 610 and back-propagated through the phoneme encoder 604 and the acoustic feature encoder 608.

One or more additional loss functions 622 may be used to compare the output feature data 616 determined by the one or more acoustic feature encoders 608 with the feature training data 632 determined in accordance with the description of FIG. 6A. The second loss function 622 thus ensures that the acoustic feature encoder 608 is trained to predict one or more of the audio properties determined from the output training data 602a, as described above. The decoder 610 thus may then determine the output data 614 based not just on the phoneme embedding data determined by the phoneme encoder 604, but also by processing the one or more audio properties represented by the output feature data 616.

Figure 7A:
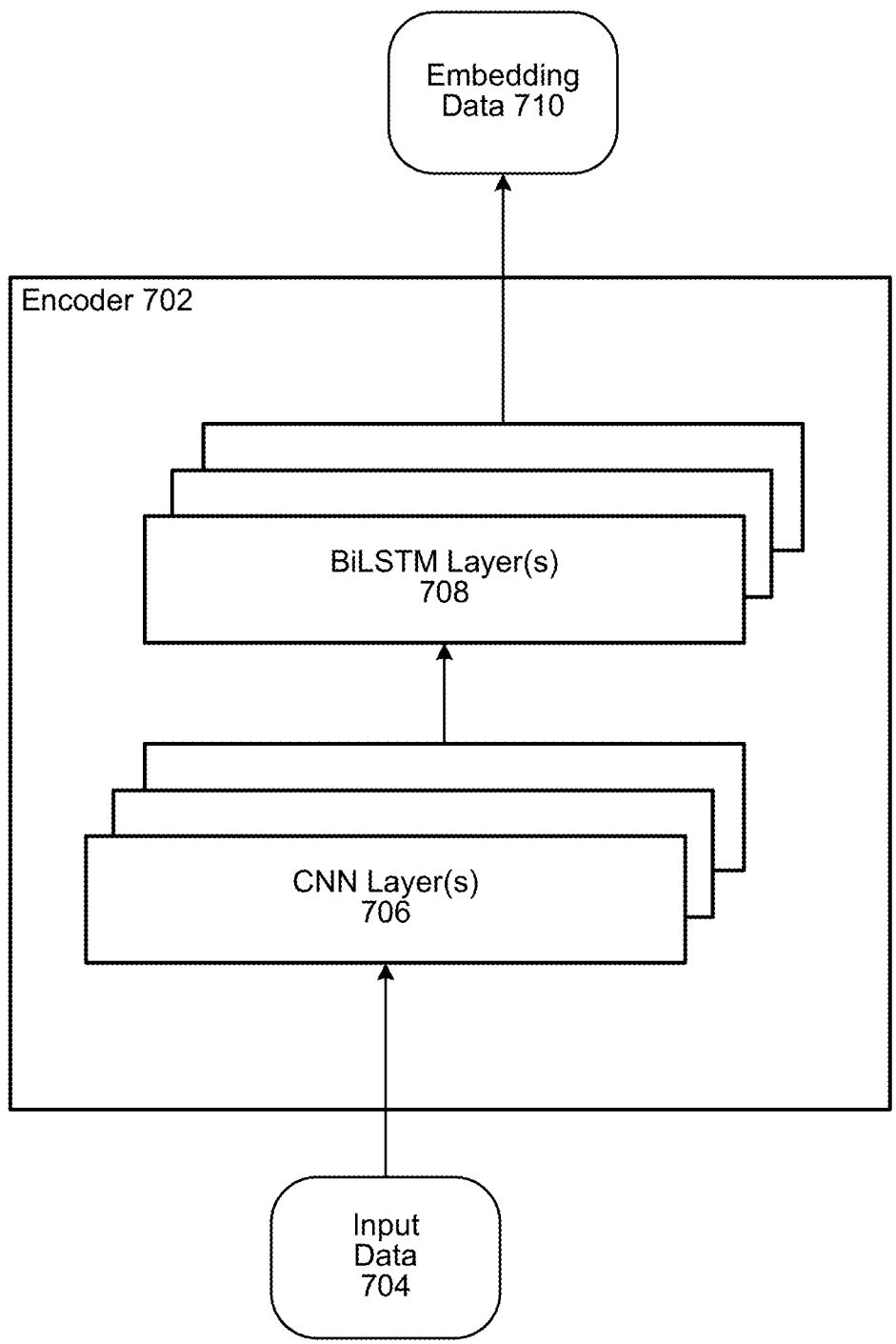
FIG. 7A illustrates components of an encoder according to embodiments of the present disclosure.
Figure 7B:
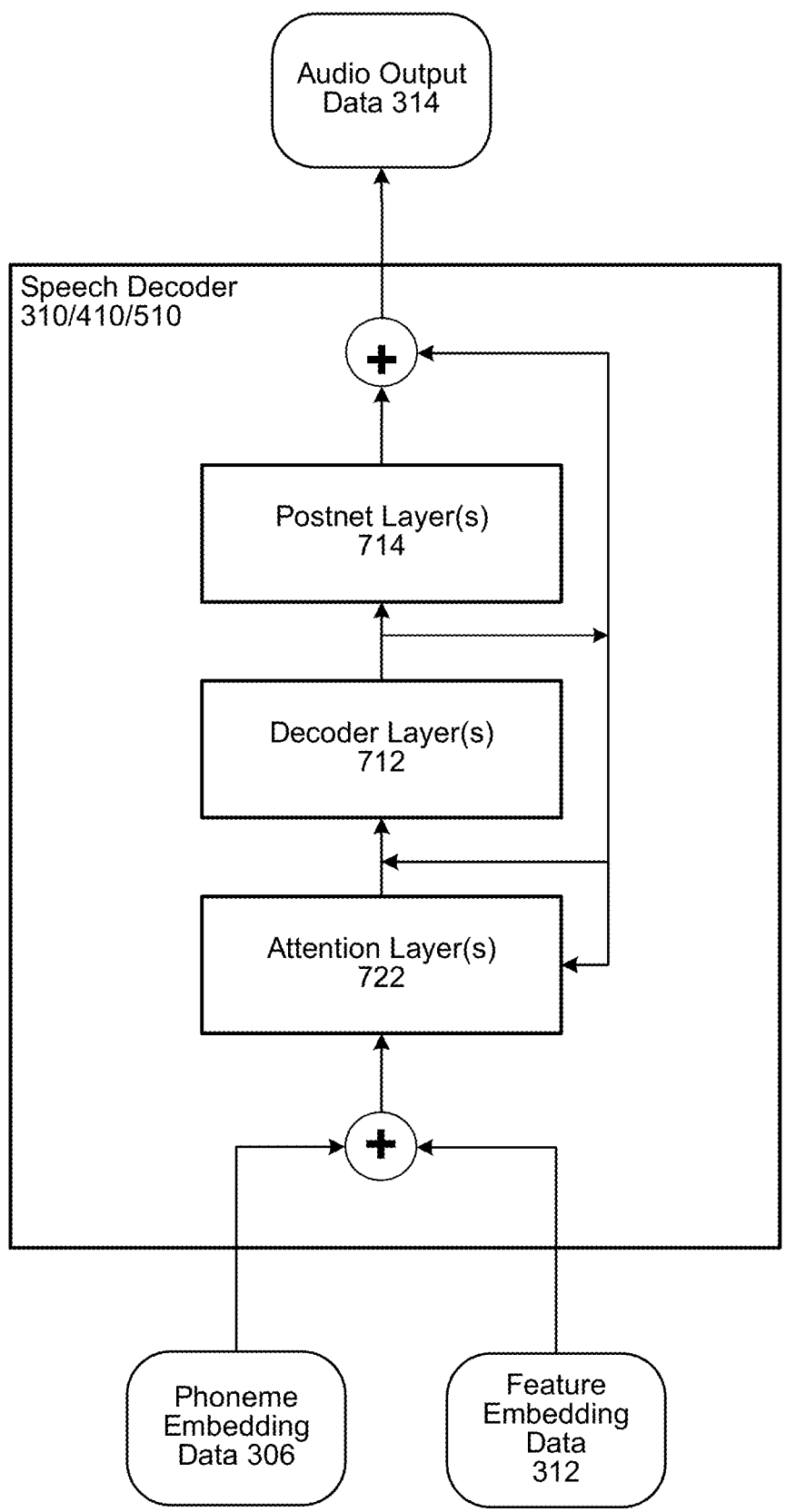
FIG. 7B illustrates components of a decoder according to embodiments of the present disclosure.

Referring to FIGS. 7A and 7B, FIG. 7A illustrates components of an encoder according to embodiments of the present disclosure, and FIG. 7B illustrates components of a decoder according to embodiments of the present disclosure. Referring first to FIG. 7A, one embodiment of an encoder 702 may include one or more convolutional neural network (CNN) layers 706 for processing input data 704 (which may be the input data 302 or output data of other encoders 702) and one or more bidirectional long short-term memory (BiLSTM) layers 708 for processing the output(s) of the CNN layers 706 to determine embedding data 710. The encoder 702 may be the phoneme encoder 304 and/or any of the acoustic feature encoders 308/320/408/420/520. In some embodiments, the encoder 702 includes three CNN layers 706 and two BiLSTM layers 708. The present disclosure is not, however, limited to only these types and numbers of layers, and other deep neural network (DNN) or recurrent neural network (RNN) layers are within its scope.

FIG. 7B illustrates components of a speech decoder 310/410/510 according to embodiments of the present disclosure. The speech decoder 310/410/510 may include one or more decoder layer(s) 712, which may include one or more LSTM or BiLSTM layers. One or more attention layer(s) 722 may process input data, such as phoneme embedding data 306 or feature embedding data 312, as well as one or more outputs of the decoder layer(s) 712 (e.g., the decoder may be auto-regressive). The attention layer(s) 722 may apply one or more weights to one or more of its inputs to thereby emphasize or "attend to" certain inputs over other inputs. One or more postnet layer(s) 714, such as linear projection, convolutional, and/or activation layers, may process the output(s) of the decoder layer(s) 712 to determine the audio output data 314.

The decoder layers 712 may include a number of different components according to embodiments of the present disclosure. A BiLSTM layer may process the input data 306/312. One or more CNN layer(s) may process the outputs of the BiLSTM layers and one or more LSTM layer(s) may process the output(s) of the CNN layers to determine the audio output data 314. In some embodiments, the decoder layers 712 include one BiLSTM layer, three CNN layers, and three LSTM layers. In some embodiments, the output of the LSTM layer(s) is further processed by a postnet layer, which may include linear projection, convolutional, or activation layers, to determine the audio output data 314. As illustrated, the decoder layers 712 may correspond to a non-autoregressive decoder, in which the audio output data 314 is determined by processing the input data, such as the feature embedding data 312 and the phoneme embedding data 306. In other embodiments, the decoder layers 712 may correspond to an autoregressive decoder, in which the audio output data 314 is determined by processing the input data and at least one previously determined item of audio output data 314 (in other words, the output data is determined based at least in part on previously generated output data). Any type of decoder, including autoregressive and non-autoregressive decoders, is within the scope of the present disclosure.

Figure 8:
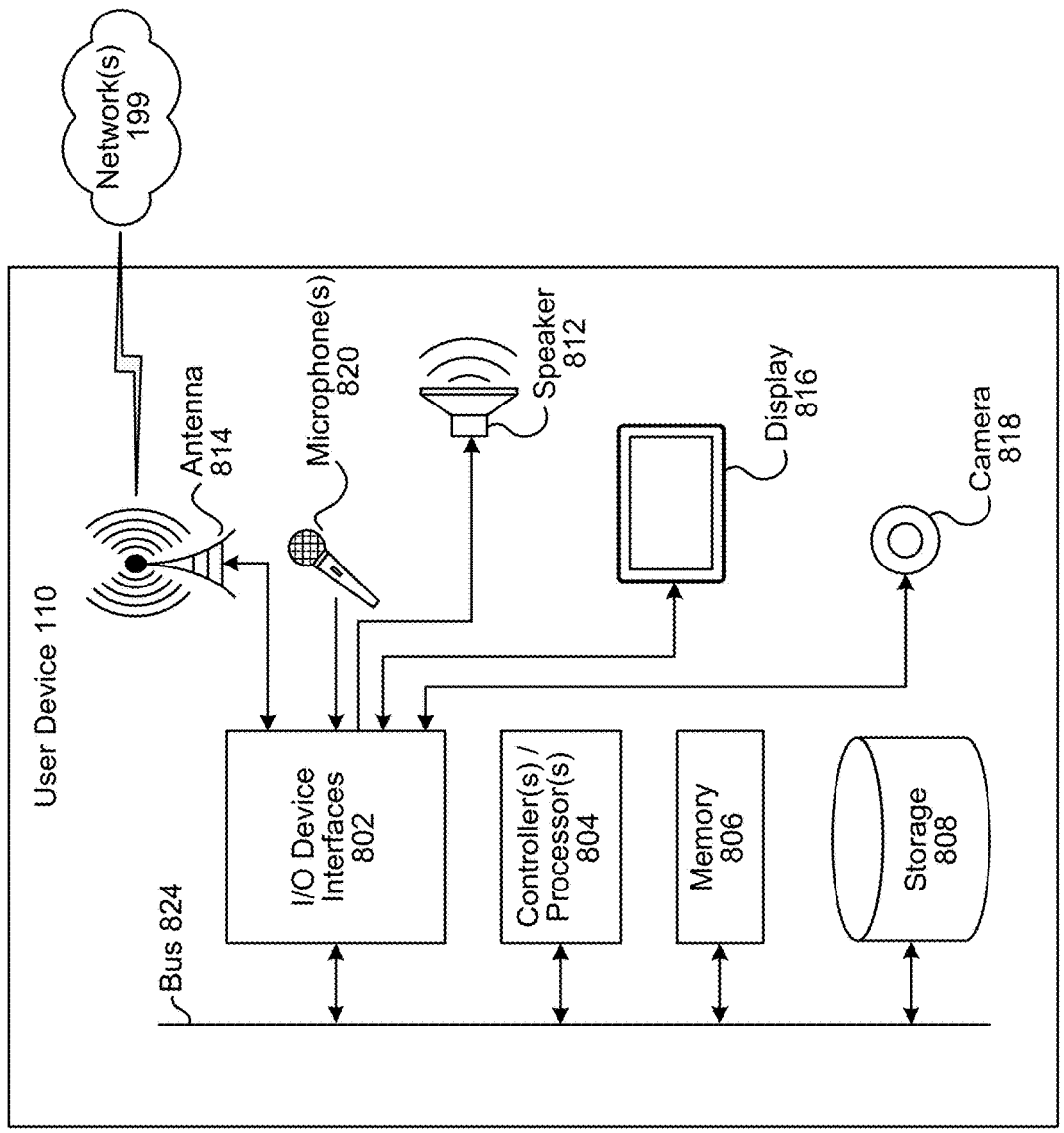
FIG. 8 illustrates components of a user device for speech processing according to embodiments of the present disclosure.
Figure 9:
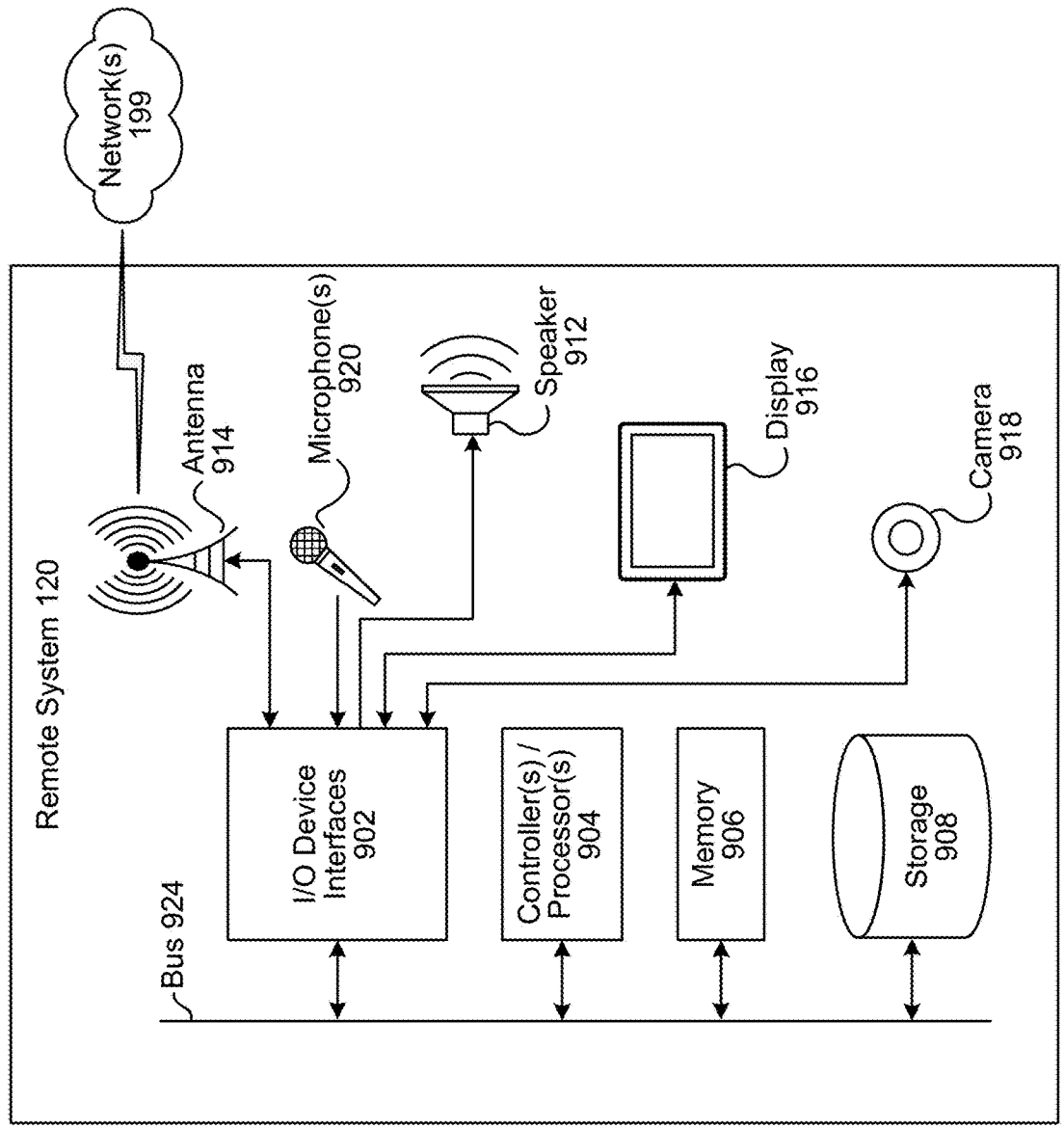
FIG. 9 illustrates components of a remote system for speech processing according to embodiments of the present disclosure.

FIG. 8 is a block diagram conceptually illustrating a user device 110. FIG. 9 is a block diagram conceptually illustrating example components of the remote system 120, which may be one or more servers and which may assist with voice-transfer processing, speech-synthesis processing, NLU processing, etc. The term "system" as used herein may refer to a traditional system as understood in a system/client computing structure but may also refer to a number of different computing components that may assist with the operations discussed herein. For example, a server may include one or more physical computing components (such as a rack system) that are connected to other devices/components either physically or over a network and is capable of performing computing operations. A server may also include one or more virtual machines that emulates a computer system and is run on one or across multiple devices. A server may also include other combinations of hardware, software, firmware, or the like to perform operations discussed herein. The server may be configured to operate using one or more of a client-system model, a computer bureau model, grid computing techniques, fog computing techniques, mainframe techniques, utility computing techniques, a peer-to-peer model, sandbox techniques, or other computing techniques.

Multiple servers may be included in the system 120, such as one or more servers for performing speech processing. In operation, each of these server (or groups of devices) may include computer-readable and computer-executable instructions that reside on the respective server, as will be discussed further below. Each of these devices/systems (110/120) may include one or more controllers/processors (804/904), which may each include a central processing unit (CPU) for processing data and computer-readable instructions, and a memory (806/906) for storing data and instructions of the respective device. The memories (806/906) may individually include volatile random access memory (RAM), non-volatile read only memory (ROM), non-volatile magnetoresistive memory (MRAM), or other types of memory. Each device (110/120) may also include a data storage component (808/908) for storing data and controller/processor-executable instructions. Each data storage component (808/908) may individually include one or more non-volatile storage types such as magnetic storage, optical storage, solid-state storage, etc. Each device (110/120) may also be connected to removable or external non-volatile memory or storage (such as a removable memory card, memory key drive, networked storage, etc.) through respective input/output device interfaces (802/902). The device 110 may further include loudspeaker(s) 812, microphone(s) 820, display(s) 816, or camera(s) 818. The remote system 120 may similarly include antenna(s) 914, loudspeaker(s) 912, microphone(s) 920, display(s) 916, or camera(s) 918.

Computer instructions for operating each device/system (110/120) and its various components may be executed by the respective device's controller(s)/processor(s) (804/904), using the memory (806/906) as temporary "working" storage at runtime. A device's computer instructions may be stored in a non-transitory manner in non-volatile memory (806/906), storage (808/908), or an external device(s). Alternatively, some or all of the executable instructions may be embedded in hardware or firmware on the respective device in addition to or instead of software.

Each device/system (110/120) includes input/output device interfaces (802/902). A variety of components may be connected through the input/output device interfaces (802/902), as will be discussed further below. Additionally, each device (110/120) may include an address/data bus (824/924) for conveying data among components of the respective device. Each component within a device (110/120) may also be directly connected to other components in addition to (or instead of) being connected to other components across the bus (824/924).

Figure 10:
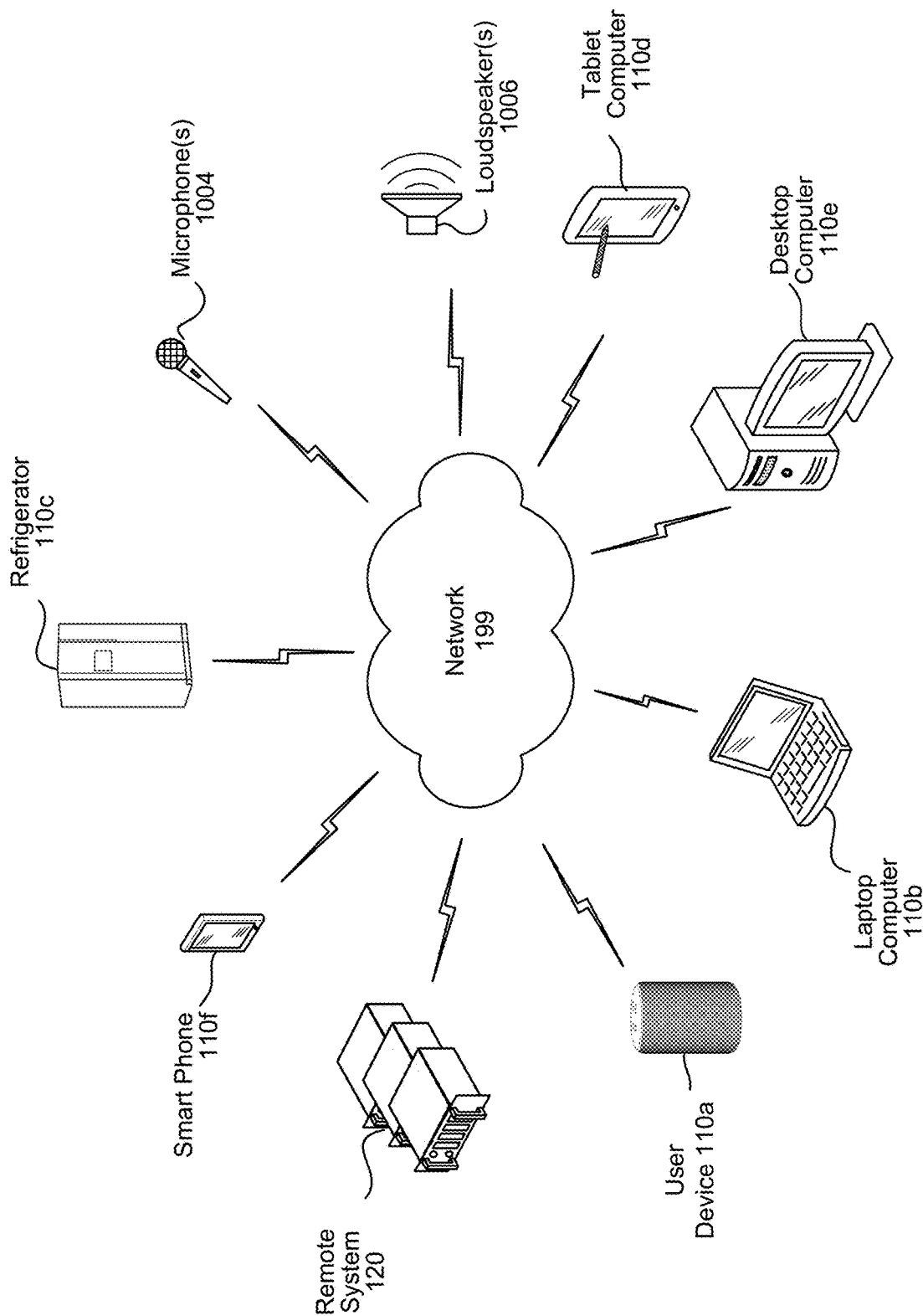
FIG. 10 illustrates a networked computing environment according to embodiments of the present disclosure.

Referring to FIG. 10, the device 110 may include input/output device interfaces 802 that connect to a variety of components such as an audio output component (e.g., a microphone 1004 or a loudspeaker 1006), a wired headset, or a wireless headset (not illustrated), or other component capable of outputting audio. The device 110 may also include an audio capture component. The audio capture component may be, for example, the microphone 820 or array of microphones, a wired headset, or a wireless headset, etc. If an array of microphones is included, approximate distance to a sound's point of origin may be determined by acoustic localization based on time and amplitude differences between sounds captured by different microphones of the array. The device 110 may additionally include a display for displaying content. The device 110 may further include a camera.

Via antenna(s) 814, the input/output device interfaces 802 may connect to one or more networks 199 via a wireless local area network (WLAN) (such as WiFi) radio, Bluetooth, or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (802/902) may also include communication components that allow data to be exchanged between devices such as different physical systems in a collection of systems or other components.

The components of the device(s) 110 or the system 120 may include their own dedicated processors, memory, or storage. Alternatively, one or more of the components of the device(s) 110 or the system 120 may utilize the I/O interfaces (802/902), processor(s) (804/904), memory (806/906), or storage (808/908) of the device(s) 110 or system 120.

As noted above, multiple devices may be employed in a single system. In such a multi-device system, each of the devices may include different components for performing different aspects of the system's processing. The multiple devices may include overlapping components. The components of the device 110 and the system 120, as described herein, are illustrative, and may be located as a stand-alone device or may be included, in whole or in part, as a component of a larger device or system.

The network 199 may further connect a voice-controlled user device 110a, a tablet computer 110d, a smart phone 110f, a refrigerator 110c, a desktop computer 110e, or a laptop computer 110b through a wireless service provider, over a WiFi or cellular network connection, or the like. Other devices may be included as network-connected support devices, such as a system 120. The support devices may connect to the network 199 through a wired connection or wireless connection. Networked devices 110 may capture audio using one-or-more built-in or connected microphones or audio-capture devices, with processing performed by components of the same device or another device connected via network 199. The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk or other media. In addition, components of one or more of the components and engines may be implemented as in firmware or hardware, such as the acoustic front end, which comprise among other things, analog or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements, or steps are in any way required for one or more embodiments or that one or more embodiments necessarily include logic for deciding, with or without other input or prompting, whether these features, elements, or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method for generating synthesized speech, the method comprising:
   receiving text data to be transformed into a sequence of phonemes corresponding to text;
   processing, using a phoneme encoder, the text data to determine phoneme embedding data representing the sequence of phonemes;
   processing, using a first neural network encoder trained to output a volume of speech corresponding to the sequence of phonemes, the phoneme embedding data to determine first feature distribution data representing variation in the volume;
   processing the first feature distribution data using a first feature distribution model to determine first acoustic feature data, the first acoustic feature data representing first predicted values corresponding to the volume;
   processing, using a second neural network encoder trained to output a pitch of speech corresponding to the sequence of phonemes, the phoneme embedding data to determine second feature distribution data representing variation in the pitch;
   processing the second feature distribution data using a second feature distribution model data to determine second acoustic feature data, the second acoustic feature data representing second predicted values corresponding to the pitch; and
   processing, using a neural network decoder, the phoneme embedding data, the first acoustic feature data, and the second acoustic feature data to determine audio data, the audio data including a representation of speech corresponding to the text data and exhibiting the volume according to the first predicted values and the pitch according to the second predicted values.

2. The computer-implemented method of claim 1, further comprising:
   prior to receiving the text data, receiving training text data;
   receiving training audio data representing second speech corresponding to the training text data;
   processing the training audio data to determine first data representing the volume;
   processing the training audio data to determine second data representing the pitch;
   wherein the first neural network encoder is trained in accordance with a first difference between the first acoustic feature data and the first data; and
   the second neural network encoder is trained in accordance with a second difference between the second acoustic feature data and the second data.

3. A computer-implemented method comprising:
   processing, using a first encoder, input data to determine first feature data representing phonemes;
   processing, using a first neural network encoder configured to determine variation in a first audio property of speech corresponding to the input data, the first feature data to determine feature distribution data representing the variation in the first audio property;
   processing the feature distribution data to determine second feature data representing first predicted values corresponding to the first audio property; and
   processing, using a neural network decoder, the first feature data and the second feature data to determine audio data, the audio data including a representation of speech corresponding to the input data and exhibiting the first audio property according to the first predicted values.

4. The computer-implemented method of claim 3, wherein:
   the neural network decoder corresponds to a first loss function; and
   the first neural network encoder corresponds to a second loss function.

5. The computer-implemented method of claim 4, wherein:
   the first loss function corresponds to a first difference between the audio data and first target data representing the speech; and
   the second loss function corresponds to a second difference between the second feature data and second target data representing the first audio property.

6. The computer-implemented method of claim 5, further comprising:
   processing the first target data to determine the second target data, wherein the second target data corresponds to at least one of a pitch, volume, or spectral tilt.

7. The computer-implemented method of claim 3, wherein determining the second feature data comprises:
   processing, using a second neural network encoder configured to predict a second audio property of speech corresponding to the input data, the first feature data to determine third feature data, the third feature data representing second predicted values corresponding to the second audio property; and
   processing, using the neural network decoder, the first feature data, the second feature data, and the third feature data to determine second audio data, the second audio data including a second representation of speech corresponding to the input data and exhibiting the first audio property according to the first predicted values and the second audio property according to the second predicted values.

8. The computer-implemented method of claim 3, further comprising:
   processing the first feature data to determine duration data corresponding to a duration corresponding to the second feature data;
   upsampling the second feature data in accordance with the duration data to determine upsampled second feature data; and
   processing, using the neural network decoder, the first feature data and the upsampled second feature data.

9. The computer-implemented method of claim 3, further comprising:
   processing, using a second neural network encoder trained to predict a second audio property of speech corresponding to second input data, the second input data to determine third feature data, the third feature data representing second predicted values corresponding to the second audio property; and processing, using the neural network decoder, the third feature data to determine second audio data, the second audio data including a representation of the second input data and exhibiting the second audio property according to the second predicted values.

10. The computer-implemented method of claim 3, wherein:
determining the second feature data comprises outputting at least one of a pitch, volume, or spectral tilt corresponding to the speech.

11. The computer-implemented method of claim 3, further comprising:
receiving, from a user device, data representing a user command; and
processing, using a natural-language understanding (NLU) component, the data to determine the input data, wherein the input data represents a response to the user command.

12. The computer-implemented method of claim 3, wherein the feature distribution data represents mu and sigma values corresponding to a distribution.

13. The computer-implemented method of claim 3, wherein the first neural network encoder represents at least a portion of a variational autoencoder.

14. A system comprising:
at least one processor; and
at least one memory including instructions that, when executed by the at least one processor, cause the system to:
process, using a first encoder, input data to determine first feature data representing phonemes;
process, using a first neural network encoder configured to determine variation in a first audio property of speech corresponding to the input data, the first feature data to determine feature distribution data representing the variation in the first audio property;
processing the feature distribution data to determine second feature data representing first predicted values corresponding to the first audio property; and
process, using a neural network decoder, the first feature data and the second feature data to determine audio data, the audio data including a representation of speech corresponding to the input data and exhibiting the first audio property according to the first predicted values.

15. The system of claim 14, wherein:
the neural network decoder corresponds to a first loss function; and
the first neural network encoder corresponds to a second loss function.

16. The system of claim 15, wherein:
the first loss function corresponds to a first difference between the audio data and first target data representing the speech; and
the second loss function corresponds to a second difference between the second feature data and second target data representing the first audio property.

17. The system of claim 16, wherein the at least one memory includes further instructions that, when executed by the at least one processor, further cause the system to:
process the first target data to determine the second target data, wherein the second target data corresponds to at least one of a pitch, volume, or spectral tilt.

18. The system of claim 14, wherein the at least one memory includes further instructions for determining the second feature data that, when executed by the at least one processor, further cause the system to:
process, using a second neural network encoder configured to predict a second audio property of speech corresponding to the input data, the first feature data to determine third feature data, the third feature data representing second predicted values corresponding to the second audio property; and
process, using the neural network decoder, the first feature data, the second feature data, and the third feature data to determine second audio data, the second audio data including a second representation of speech corresponding to the input data and exhibiting the first audio property according to the first predicted values and the second audio property according to the second predicted values.

19. The system of claim 14, wherein the at least one memory includes further instructions that, when executed by the at least one processor, further cause the system to:
process the first feature data to determine duration data corresponding to a duration corresponding to the second feature data;
upsample the second feature data in accordance with the duration data to determine upsampled second feature data; and
process, using the neural network decoder, the first feature data and the upsampled second feature data.

20. The system of claim 14, wherein the at least one memory includes further instructions that, when executed by the at least one processor, further cause the system to:
process, using a second neural network encoder trained to predict a second audio property of speech corresponding to second input data, the second input data to determine third feature data, the third feature data representing second predicted values corresponding to second audio property; and
process, using the neural network decoder, the third feature data to determine second audio data, the second audio data including a representation of the second input data and exhibiting the second audio property according to the second predicted values.

21. The system of claim 14, wherein the at least one memory includes further instructions that, when executed by the at least one processor, further cause the system to:
determine the second feature data comprises outputting at least one of a pitch, volume, or spectral tilt corresponding to the speech.

22. The system of claim 14, wherein the at least one memory includes further instructions that, when executed by the at least one processor, further cause the system to:
receive, from a user device, data representing a user command; and
process, using a natural-language understanding (NLU) component, the data to determine the input data, wherein the input data represents a response to the user command.

23. The system of claim 14, wherein the feature distribution data represents mu and sigma values corresponding to a distribution.

24. The system of claim 14, wherein the first neural network encoder represents at least a portion of a variational autoencoder.

* * * * *